United States Patent
Masui

(10) Patent No.: US 9,030,517 B2
(45) Date of Patent: May 12, 2015

(54) PIXEL CLOCK GENERATING DEVICE AND IMAGE FORMING APPARATUS

(75) Inventor: Naruhiro Masui, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1101 days.

(21) Appl. No.: 13/042,006

(22) Filed: Mar. 7, 2011

(65) Prior Publication Data

US 2011/0221739 A1 Sep. 15, 2011

(30) Foreign Application Priority Data

Mar. 11, 2010 (JP) ................................. 2010-055009

(51) Int. Cl.
*B41J 2/435* (2006.01)
*H04N 1/053* (2006.01)
*G02B 26/12* (2006.01)
*G06K 15/12* (2006.01)
*H04N 1/113* (2006.01)
(Continued)

(52) U.S. Cl.
CPC .............. *H04N 1/053* (2013.01); *G02B 26/123* (2013.01); *G02B 26/127* (2013.01); *G06K 15/1219* (2013.01); *H04N 1/1135* (2013.01); *H04N 1/506* (2013.01); *H04N 2201/0471* (2013.01); *H04N 2201/04729* (2013.01); *H04N 2201/04734* (2013.01); *H04N 2201/04744* (2013.01); *H04N 2201/04768* (2013.01); *H04N 2201/04772* (2013.01); *H04N 2201/04774* (2013.01); *H04N 2201/04775* (2013.01); *H04N 2201/04784* (2013.01); *H04N 2201/04789* (2013.01); *H04N 2201/04793* (2013.01); *H04N 2201/04794* (2013.01); *H04N 2201/04798* (2013.01); *G03G 15/04072* (2013.01)

(58) Field of Classification Search
USPC .......... 375/240; 347/229, 231, 234, 235, 243, 347/248–250, 259–261
See application file for complete search history.

(56) References Cited

U.S. PATENT DOCUMENTS 4,872,065 A * 10/1989 Isono et al. ................... 358/494
6,151,152 A 11/2000 Neary
7,145,705 B2 12/2006 Hayashi
(Continued)

FOREIGN PATENT DOCUMENTS

JP 2000-152001 5/2000
JP 2001-183600 7/2001
(Continued)

OTHER PUBLICATIONS

Japanese Office Action dated Oct. 29, 2013.

*Primary Examiner* — Hai C Pham
(74) *Attorney, Agent, or Firm* — IPUSA, PLLC

(57) ABSTRACT

A pixel clock generating device includes a time interval detection unit detecting a time interval between a first signal and a second signal in each of cyclically repeating N ($\geq 2$) time periods; a comparing unit cyclically selecting a target value from N target values corresponding to the N time periods and outputting an error indicating a difference between the detected time interval and the selected target value for each of the N time periods; a frequency calculation unit correcting a frequency of the pixel clock signal based on the error and cyclically generating a frequency specification signal indicating the corrected frequency for each of the N time periods; a high-frequency clock generating unit generating a high-frequency clock signal; and a pixel clock generating unit generating a pixel clock signal based on the frequency specification signal and the high-frequency clock signal.

4 Claims, 28 Drawing Sheets

(51) Int. Cl.
*H04N 1/50* (2006.01)
*G03G 15/04* (2006.01)

(56) References Cited

U.S. PATENT DOCUMENTS

| 7,791,634 B2 * | 9/2010 | Masui et al. ............ 347/249 |
| 2007/0058255 A1 | 3/2007 | Imai et al. |

FOREIGN PATENT DOCUMENTS

| JP | 2004-262101 | 9/2004 |
| JP | 2005-092129 | 4/2005 |
| JP | 2006-305780 | 11/2006 |
| JP | 2007-069572 | 3/2007 |
| JP | 2010-069630 | 4/2010 |

\* cited by examiner

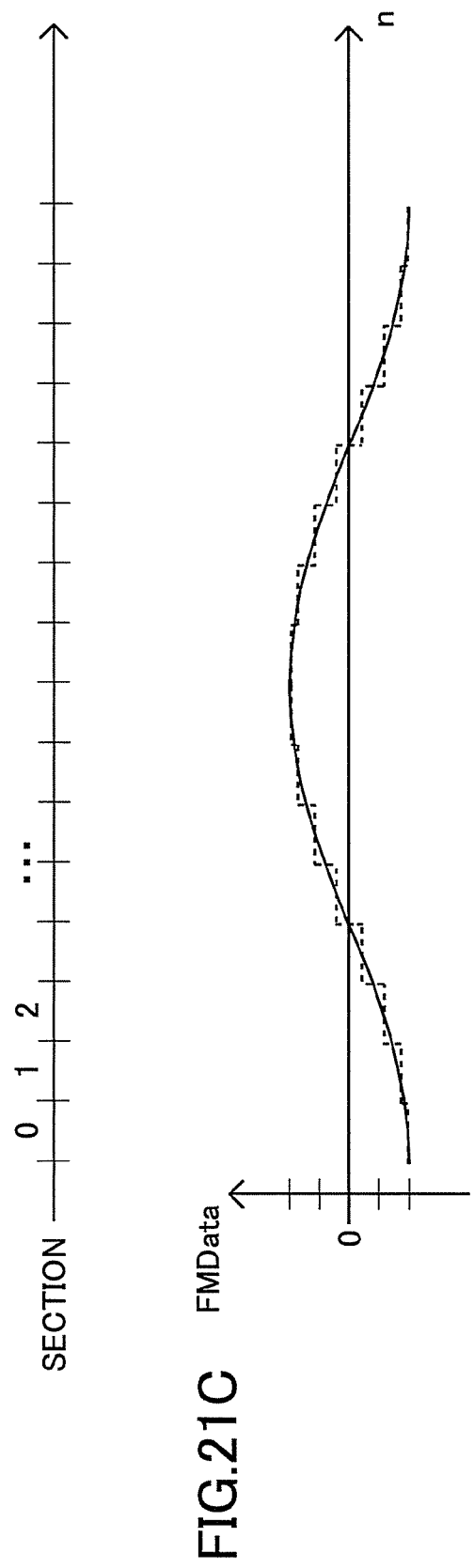

PIXEL CLOCK GENERATING DEVICE AND IMAGE FORMING APPARATUS

CROSS-REFERENCE TO RELATED APPLICATION

The present application is based upon and claims the benefit of priority of Japanese Patent Application No. 2010-055009, filed on Mar. 11, 2010, the entire contents of which are incorporated herein by reference.

BACKGROUND OF THE INVENTION

1. Field of the Invention

A certain aspect of this disclosure relates to a pixel clock generating device and an image forming apparatus including the pixel clock generating device.

2. Description of the Related Art

FIG. 26 is a schematic diagram of a related-art image forming apparatus. The image forming apparatus of FIG. 26 is, for example, a laser printer or a digital copier that forms an image by an electrophotographic process. As shown in FIG. 26, a laser beam (scanning beam) emitted from a semiconductor laser unit 1009 is deflected by a rotating polygon mirror 1003, passes through a scanning lens 1002, and forms a beam spot on a photoconductor 1001. The photoconductor 1001 is scanned and exposed by the beam spot and as a result, an electrostatic latent image is formed. During this process, a photodetector 1004 detects the scanning beam for each line.

A phase-locked loop 1006 receives a clock signal from a clock generating circuit 1005, generates a phase-locked (or phase-synchronized) image clock signal (pixel clock signal) for each line based on an output signal from the photodetector 1004, and supplies the generated image clock signal to an image processing unit 1007 and a laser driving circuit 1008. A pixel clock signal is used, for example, to determine the timing for processing pixels, to control the timing for scanning a line, and to control light sources (laser units). The laser driving circuit 1008 controls the light emitting time of the semiconductor laser unit 1009 according to image data generated by the image processing unit 1007 and the phase-locked image clock signal generated by the phase-locked loop 1006 for each line and thereby controls the formation of an electrostatic latent image on the photoconductor 1001.

In a scanning optical system as described above, variation in scanning speed leads to irregularity in an image and degrades image quality. Particularly when forming a color image, variation in scanning speed causes positional errors of dots of different colors in the main scanning direction. This in turn causes color shift and reduces color reproducibility and image resolution. Therefore, to improve image quality, it is necessary to reduce the variation in scanning speed.

Major causes of variation in scanning speed (scanning speed errors) are described below.

(1) Variation in scanning speed (between scan lines) related to surfaces of polygon mirror Variation in scanning speed may be caused by the variation in distance of the surfaces (reflecting surfaces) of a deflector such as a polygon mirror from its rotating shaft (i.e., decentering of the axis of a polygon mirror) and the variation in precision of the surfaces. This type of variation in scanning speed has a cycle of several lines (for example, the number of lines corresponding to the number of surfaces of a polygon mirror).

(2) Variation in Average Scanning Speed

The average scanning speed indicates an average of scanning speeds of the surfaces of a polygon mirror. Variation in the average scanning speed is caused by, for example, the variation in rotational speed of a polygon mirror and various changes in a scanning optical system caused by environmental changes in temperature, humidity, vibration, and so on. Also, variation in average scanning speed may be caused by chromatic aberration in a scanning optical system that occurs when the oscillation wavelength of a semiconductor laser, or a light source, changes due to, for example, a temperature change. This type of variation in scanning speed is moderate compared to other types.

In a multi-beam optical system that includes multiple light sources such as a semiconductor laser array and where multiple light beams are scanned by a common scanning optical system at the same time, variation in scanning speed may be caused by reasons as described below.

(3) Variation in Scanning Speed Related to Light Sources

Variation in scanning speed may occur due to chromatic aberration of a scanning optical system when light sources have different oscillation wavelengths. Here, when the oscillation wavelength differs from one light source to another, the variation in average scanning speed as described in (2) may differ depending on the light source. Also, the scanning speed of laser beams may vary depending on the mounting accuracy of light sources.

In an image forming apparatus (tandem image forming apparatus) including multiple photoconductors and scanning optical systems and configured to form a color image, the difference in scanning speed of the scanning optical systems greatly affects the image quality.

(4) Variation in Scanning Speed Related Scanning Optical Systems

Variation in scanning speed related to scanning optical systems may be caused by inaccurate production and assembly of parts of the scanning optical systems and deformation of the parts over time. Also, since a tandem image forming apparatus generally includes multiple light sources, the variation as described in (3) may also occur. In a tandem image forming apparatus, the average scanning speed may differ from one scanning optical system to another, and the variation in scanning speed as described in (1) and (2) may be observed in each of the scanning optical systems.

There is an image forming apparatus where some components are shared by multiple scanning optical systems. Even in this case, since there are multiple optical paths from the light sources to the photoconductors, the variation in scanning speed described in (4) may also occur.

There is a known method where a scanning speed error is corrected by changing the frequency of a pixel clock signal depending on the scanning speed. In this method, the frequency of an oscillator for generating a pixel clock signal is controlled (i.e., phase-locked loop (PLL) control) so that the count of cycles of the pixel clock signal between the start and end of scanning becomes a predetermined value.

However, the above method has a disadvantage as described below. In the above method, the frequency of a reference clock signal used for phase comparison corresponds to one line, and is therefore far lower than (one in several thousands to one in tens of thousands) that of a pixel clock to be generated. Therefore, it is difficult to achieve sufficient open loop gain of the phase-locked loop and to accurately control the frequency of the pixel clock signal. Also, since the clock frequency, is easily affected by disturbance, it is difficult to accurately generate a pixel clock signal. Further, since it is necessary to change the control voltage of a voltage-controlled oscillator (VCO) for each scan to correct the scanning speed error for each surface, it takes a long time before the clock frequency becomes stable.

There is another method for correcting a scanning speed error where the phase of a pixel clock signal is controlled based on a generated high frequency clock signal. In this method, the phase of a pixel clock signal is controlled so that the count of cycles of the high frequency clock signal between the start and end of scanning becomes a predetermined value.

The high frequency clock signal is accurately generated based on an accurate reference clock signal generated, for example, by a crystal oscillator. Using such an accurate high frequency clock signal for the phase control of a pixel clock signal makes it possible to accurately generate the pixel clock signal. However, to correct a scanning speed error by controlling the phase of a pixel clock signal, it is necessary to generate phase control data for one scan line. Also, to reduce local deviation caused by the phase change of the pixel clock signal and thereby to accurately generate the pixel clock signal, it is necessary to perform high-resolution phase control and as a result, the size of the phase control data becomes large. Accordingly, it is difficult to accurately generate such large phase control data at high speed and a very high-speed control circuit is necessary to perform real-time control. Also, to correct scanning speed errors for respective surfaces of a polygon mirror with the above method, it is necessary to generate the phase control data for each surface. Therefore, in this case, it is necessary to generate and store a far larger amount of phase control data. Further, inaccurate production and assembly of parts of a scanning optical system may cause the scanning speed to vary even during the scanning of one line.

(5) Nonlinear Errors

FIG. 27A is a graph showing exemplary nonlinear errors in scanning speed during the scanning of one line. In FIG. 27A, the horizontal axis indicates positions X in a scan line and the vertical axis indicates scanning speeds V(X) at the positions X. Also a dashed-dotted line Vavg indicates the average scanning speed during the scanning of one line. When the scanning speed varies as shown in FIG. 27A, deviations Δ from a desired value at a constant scanning speed are indicated by a solid line in FIG. 27B. The deviations Δ indicate positional errors of dots that cause degradation of image quality. In FIG. 27B, the dotted line indicates deviations Δ in a case where scanning is performed in a direction from a position X2 to a position X1 in FIG. 27A. As shown in FIGS. 27A and 27B, when scanning is performed in both directions with a scanning optical system where positional errors of dots occur asymmetrically with respect to the center of scanning, color shift increases and image quality is greatly degraded.

Also, the degree and distribution of the deviations Δ may vary depending on the precision of each surface of a polygon mirror. Further, the degree and distribution of the deviations Δ may vary from one scanning optical system to another.

There is a method for correcting nonlinear errors in scanning speed by modulating the frequency of a pixel clock signal according to the position in a scan line. With this method, however, since the center frequency of a pixel clock signal is generated in a conventional manner, it is difficult to generate an accurate pixel clock signal and effectively correct the nonlinear errors in scanning speed. Thus, this method is not effective to improve image quality.

Japanese Laid-Open Patent Publication No. 2006-305780 discloses a pixel clock generating device for generating a pixel clock signal that can accurately correct scanning speed errors and nonlinear errors as described in (1) through (5) above.

The disclosed pixel clock generating device includes a high-frequency clock generating unit for generating a high-frequency clock signal, a first edge detection unit for detecting a first synchronization signal, a second edge detection signal for detecting a second synchronization signal, and a comparing unit that compares the time interval between the first synchronization signal and the second synchronization signal with a target value to determine the difference. The disclosed pixel clock generating unit also includes a frequency divider that generates a pixel clock signal by frequency-dividing the high-frequency clock signal generated by the high-frequency clock generating unit, and a frequency calculation unit that outputs a frequency specification signal specifying a pixel clock signal frequency based on the difference determined by the comparing unit to correct the pixel clock signal and thereby to correct an error in the scanning speed.

Meanwhile, Japanese Laid-Open Patent Publication No. 2005-92129 discloses a tandem image forming apparatus that can form an image at high speed with a small number of light sources.

FIG. 28 illustrates an optical scanning device of the image forming apparatus disclosed in JP2005-92129. In the disclosed optical scanning device, two photoconductor drums 157a and 157b are scanned alternately in a time-sharing manner with light beams emitted from light sources 901 and 901' to form two electrostatic latent images. The disclosed optical scanning device also includes one laser driving circuit for each of the light sources 901 and 901'. Each of the two laser driving circuit modulates, for alternate lines, signals for forming the electrostatic latent images on the photoconductor drums 157a and 157b.

Here, the scanning speeds of light beams emitted from one light source and scanning the photoconductor drums 157a and 157b may vary for the reasons described above. In the optical scanning device of FIG. 28, the light beam for scanning the photoconductor drum 157a is deflected by an upper polygon mirror 907a of an optical deflector 907, and the light beam for scanning the photoconductor drum 157b is deflected by a lower polygon mirror 907b of the optical deflector 907. Therefore, as described in (1) above, the scanning speed of the light beam varies from one surface to another depending on the degree of precision of the polygon mirror, and the degree of variation also differs between the polygon mirrors. Also, since the light beams reach the photoconductor drums 157a and 157b via different optical components, the variation in scanning speed related to scanning optical systems as described in (4) may occur. Further, nonlinear errors as described in (5) may occur. Such variation (or errors) in scanning speed may cause positional errors in the main scanning direction of dots constituting images formed on the photoconductor drums 157a and 157b, and the positional errors of dots may cause color shift and reduces the image quality such as color reproducibility and image resolution.

Here, it may be possible to combine the pixel clock generating device disclosed in JP2006-305780 with the tandem image forming apparatus disclosed in JP2005-92129. However, with a configuration where one light source is used to optically scan different optical scanning positions (or lines) in a time-sharing manner, the light source is driven based on one pixel clock signal (i.e., there is only one target to be controlled). Since the scanning speed errors and the nonlinear errors (and also target values) differ from one optical scanning position to another, it is difficult to accurately correct those errors with one pixel clock signal.

SUMMARY OF THE INVENTION

In an aspect of this disclosure, a pixel clock generating device includes a time interval detection unit detecting a time interval between a first signal and a second signal in each of cyclically repeating N time periods; a comparing unit cyclically selecting a target value from N target values corresponding to the N time periods and outputting an error indicating a difference between the detected time interval and the selected target value for each of the N time periods; a frequency calculation unit correcting a frequency of the pixel clock signal based on the error and cyclically generating a frequency specification signal indicating the corrected frequency for each of the N time periods; a high-frequency clock generating unit generating a high-frequency clock signal; and a pixel clock generating unit generating a pixel clock signal based on the frequency specification signal and the high-frequency clock signal.

BRIEF DESCRIPTION OF THE DRAWINGS

FIG. 21C is a graph showing frequency modulation data;

DESCRIPTION OF THE PREFERRED EMBODIMENTS

Preferred embodiments of the present invention are described below with reference to the accompanying drawings.

First Embodiment

Figure 1:
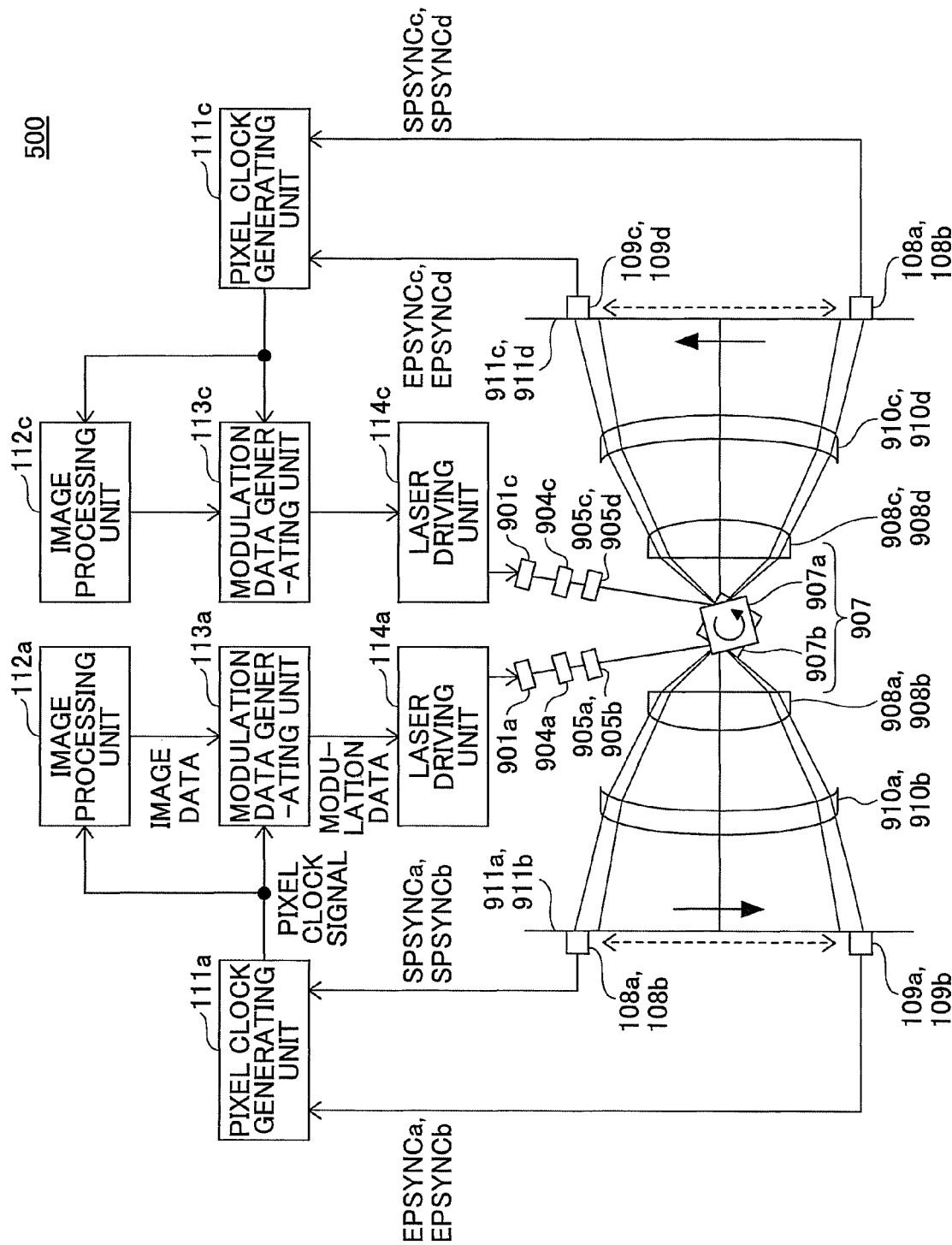
FIG. 1 is a drawing illustrating an exemplary configuration of an image forming apparatus.
Figure 2:
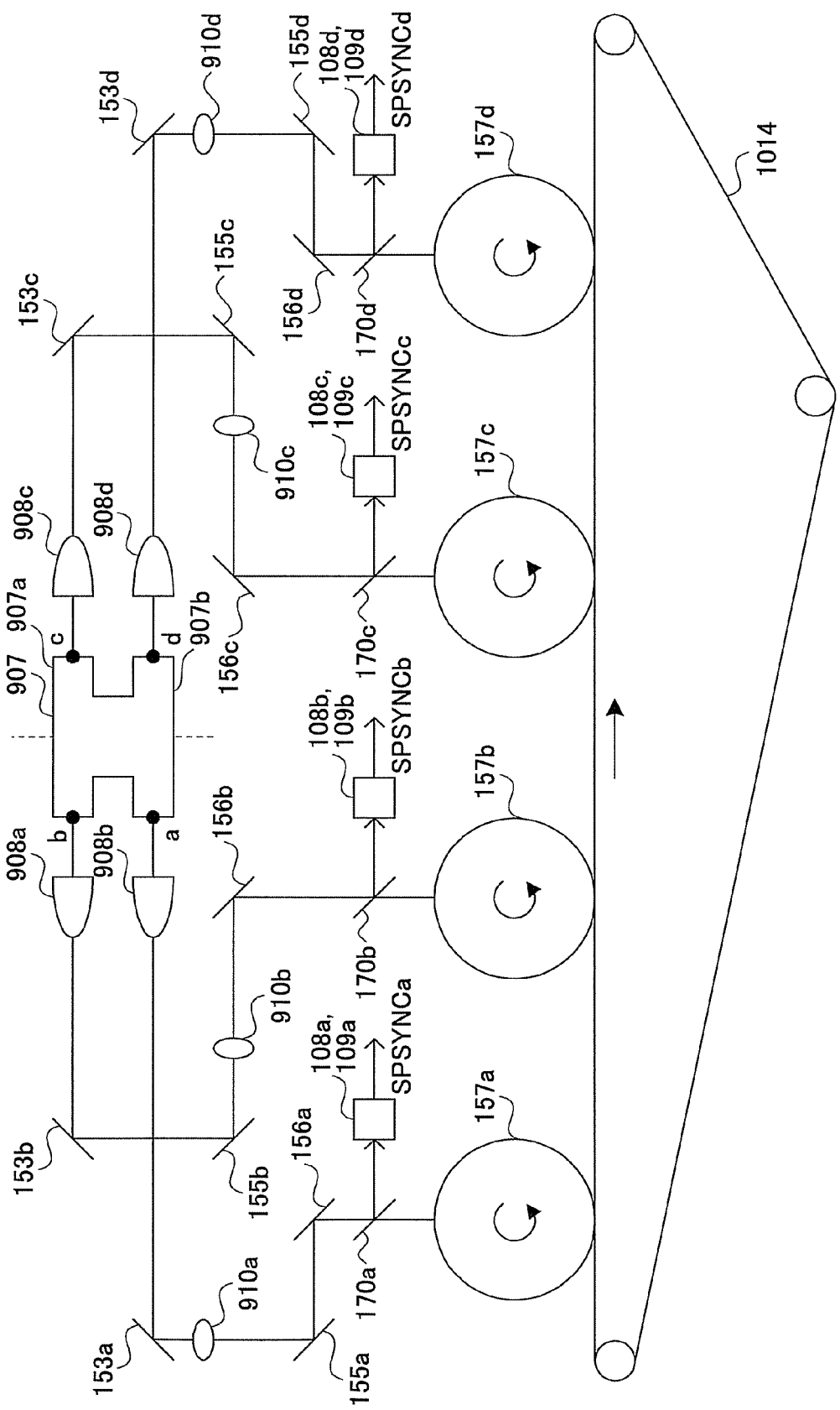
FIG. 2 is a schematic side view of an exemplary optical system of a tandem image forming apparatus.

FIG. 1 is a drawing illustrating an exemplary configuration of an image forming apparatus 500 according to a first embodiment of the present invention. The image forming apparatus 500 is a tandem image forming apparatus including multiple photoconductors and is capable of forming a multicolor image. FIG. 2 is a schematic side view of an exemplary optical system of the image forming apparatus 500. In FIG. 1, for brevity, some components such as mirrors in optical paths from an optical deflector 907 (an upper polygon mirror 907a and a lower polygon mirror 907b) to optical scanning positions 911 (911a, 911b, 911c, and 911d) are omitted and the optical paths are represented by straight lines. Also, the positions of components in FIG. 1 and FIG. 2 do not exactly correspond to each other.

The image forming apparatus 500 includes separate photoconductor drums (photoconductors) 157 (157a, 157b, 157c, and 157d) for cyan, magenta, yellow, and black colors and scanning optical systems corresponding to the photoconductor drums 157, and is configured to form images (electrostatic latent images) of the respective colors on the corresponding photoconductor drums 157. A color image is formed by transferring the images (toner images) of the respective colors onto a recording medium (for example, paper). Here, an image forming apparatus may have a configuration where some components are shared by multiple scanning optical systems for downsizing. Even in this case, there are multiple optical paths from the light sources to the photoconductor drums. Therefore, the present invention may also be applied to such an image forming apparatus.

As illustrated in FIGS. 1 and 2, the optical deflector 907 includes the upper polygon mirror 907a and the lower polygon mirror 907b that rotate counterclockwise about an axis indicated by a dotted line. A laser beam emitted from a semiconductor laser 901a is divided into upper and lower laser beams and the laser beams are reflected (or deflected) by the upper and lower polygon mirrors 907a and 907b. Similarly, a laser beam emitted from a semiconductor laser 901c is divided into upper and lower laser beams and the laser beams are reflected (or deflected) by the upper and lower polygon mirrors 907a and 907b. With this configuration, it is possible to scan the four photoconductor drums 157 with four laser beams at substantially the same time.

Referring to FIGS. 1 and 2, a laser beam emitted from the semiconductor laser (light source) 901a is collimated by a coupling lens (not shown), is shaped by an aperture (not shown), enters a half-mirror prism 904a, and is thereby divided into two laser beams in the sub-scanning direction. Since the laser beams are parallel to or overlap each other in the vertical direction, they are represented by one line in FIG. 1.

The two laser beams are focused in the sub-scanning direction by cylindrical lenses 905a and 905b arranged in the sub-scanning direction (i.e., arranged one above the other) and enter the optical deflector 907. The optical deflector 907 includes the upper and lower polygon mirrors 907a and 907b each having four surfaces. The upper and lower polygon mirrors 907a and 907b are joined together and arranged one above the other along the rotational axis. The surfaces of the upper and lower polygon mirrors 907a and 907b are shifted from each other in the rotational direction to form an angle (e.g., 45 degrees, the angle depends on the number of surfaces of the polygon mirror).

The laser beams are deflected by the optical deflector 907, pass through first scanning lenses 908a and 908b and second scanning lenses 910a and 910b, and are reflected by mirrors 153a, 153b, 155a, 155b, 156a, 156b, 170a, and 170b (here, for brevity, the order of the components are ignored). The laser beams form beam spots at optical scanning positions 911a and 911b (on the photoconductor drums 157) and scan the optical scanning positions 911a and 911b in the direction indicated by an arrow shown in FIG. 1. More specifically, the laser beam passing through the cylindrical lens 905a is deflected by the upper polygon mirror 907a and scans the optical scanning position 911a. Meanwhile, the laser beam passing through the cylindrical lens 905b is deflected by the lower polygon mirror 907b and scans the optical scanning position 911b.

Similarly, a laser beam emitted from the semiconductor laser (light source) 901c is collimated by a coupling lens (not shown), is shaped by an aperture (not shown), enters a half-mirror prism 904c, and is thereby divided into two laser beams in the sub-scanning direction. The two laser beams are focused in the sub-scanning direction by cylindrical lenses 905c and 905d arranged in the sub-scanning direction (i.e., arranged one above the other) and enter the optical deflector 907. The laser beams are deflected by the optical deflector 907, pass through first scanning lenses 908c and 908d and second scanning lenses 910c and 910d, and are reflected by mirrors 153c, 153d, 155c, 155d, 156c, 156d, 170c, and 170d (here, for brevity, the order of the components are ignored). The laser beams form beam spots at optical scanning positions 911c and 911d (on the photoconductor drums 157) and scan the optical scanning positions 911c and 911d in the direction indicated by an arrow shown in FIG. 1.

As illustrated in FIG. 2, the photoconductor drums 157a, 157b, 157c, and 157d are disposed at the optical scanning positions 911a, 911b, 911c, and 911d. Electrostatic latent images are formed by the laser beams on the photoconductor drums. The electrostatic latent images are developed, respectively, by magenta, yellow, cyan, and black toner and the developed images (toner images) are transferred onto an intermediate transfer belt 1014 to form a color image. In FIG. 1, arrowed dotted lines in the optical scanning positions 911 indicate image areas in the main-scanning direction.

Photodetectors (PD) 108a and 109a, 108b and 109b, 108c and 109c, and 108d and 109d are disposed at the ends of the corresponding optical scanning positions outside of the image areas. The PDs 108a, 108b, 108c, and 108d detect the start of scanning, and the PDs 109a, 109b, 109c, and 109d detect the end of scanning. The suffixes a-d of the reference numbers assigned to optical components correspond to the suffixes a-d of the reference numbers assigned to the optical scanning positions 911.

The PDs 108a and 108b convert incoming laser beams into first synchronization signals SPSYNCa and SPSYNCb and send them to a pixel clock generating unit 111a. The PDs 109a and 109b convert incoming laser beams into second synchronization signals EPSYNCa and EPSYNCb and send them to the pixel clock generating unit 111a. Similarly, the PDs 108c and 108d convert incoming laser beams into first synchronization signals SPSYNCc and SPSYNCd and send them to a pixel clock generating unit 111c. The PDs 109c and 109d convert incoming laser beams into second synchronization signals EPSYNCc and EPSYNCd and send them to the pixel clock generating unit 111c.

The pixel clock generating unit 111a calculates a scanning time (or time interval) the laser beam takes to scan between the PDs 108a and 109a based on the synchronization signals SPSYNCa and EPSYNCa. Then, the pixel clock generating unit 111a determines a frequency of a pixel clock signal PCLK such that a predetermined number of cycles occur within the calculated scanning time and generates the pixel clock signal PCLK with the determined frequency. The pixel clock generating unit 111a also generates the pixel clock signal PCLK in a similar manner based on the synchronization signals SPSYNCb, and EPSYNCb. The two sets of synchronization signals (SPSYNCa and EPSYNCa, and SPSYNCb and EPSYNCb) are input alternately (at different timings) to the pixel clock generating unit 111a. Therefore the pixel clock generating unit 111a calculates the scanning time based on each set of the synchronization signals and generates the pixel clock signal PCLK based on the calculated scanning time. Details of the pixel clock generating unit 111 are described later. The pixel clock generating unit 111a sends the pixel clock signal PCLK to an image processing unit 112a and a modulation data generating unit 113a.

The first synchronization signals SPSYNCa and SPSYNCb are also sent from the PDs 108a and 108b to the image processing unit 112a as line synchronization signals. The image processing unit 112a generates two sets of image data for two colors based on the pixel clock signal PCLK and outputs the two sets of image data alternately for each line based on the first synchronization signals SPSYNCa and SPSYNCb. The modulation data generating unit 113a generates modulation data from the image data input from the image processing unit 112a based on the pixel clock signal PCLK and causes a laser driving unit 114a to drive the semiconductor laser 901a based on the generated modulation data.

Similarly, a pixel clock generating unit 111c generates a pixel clock signal PCLK, an image processing unit 112c generates image data, and a modulation data generating unit 113c generates modulation data from the image data and causes a laser driving unit 114c to drive the semiconductor laser 901c. Since the pixel clock generating units 111a and 111c have substantially the same configurations and functions, descriptions related to the pixel clock generating unit 111a also apply to the pixel clock generating unit 111c, and the pixel clock generating units 111a and 111c may be referred to as the pixel clock generating unit 111.

<SelUL>

Figure 3:
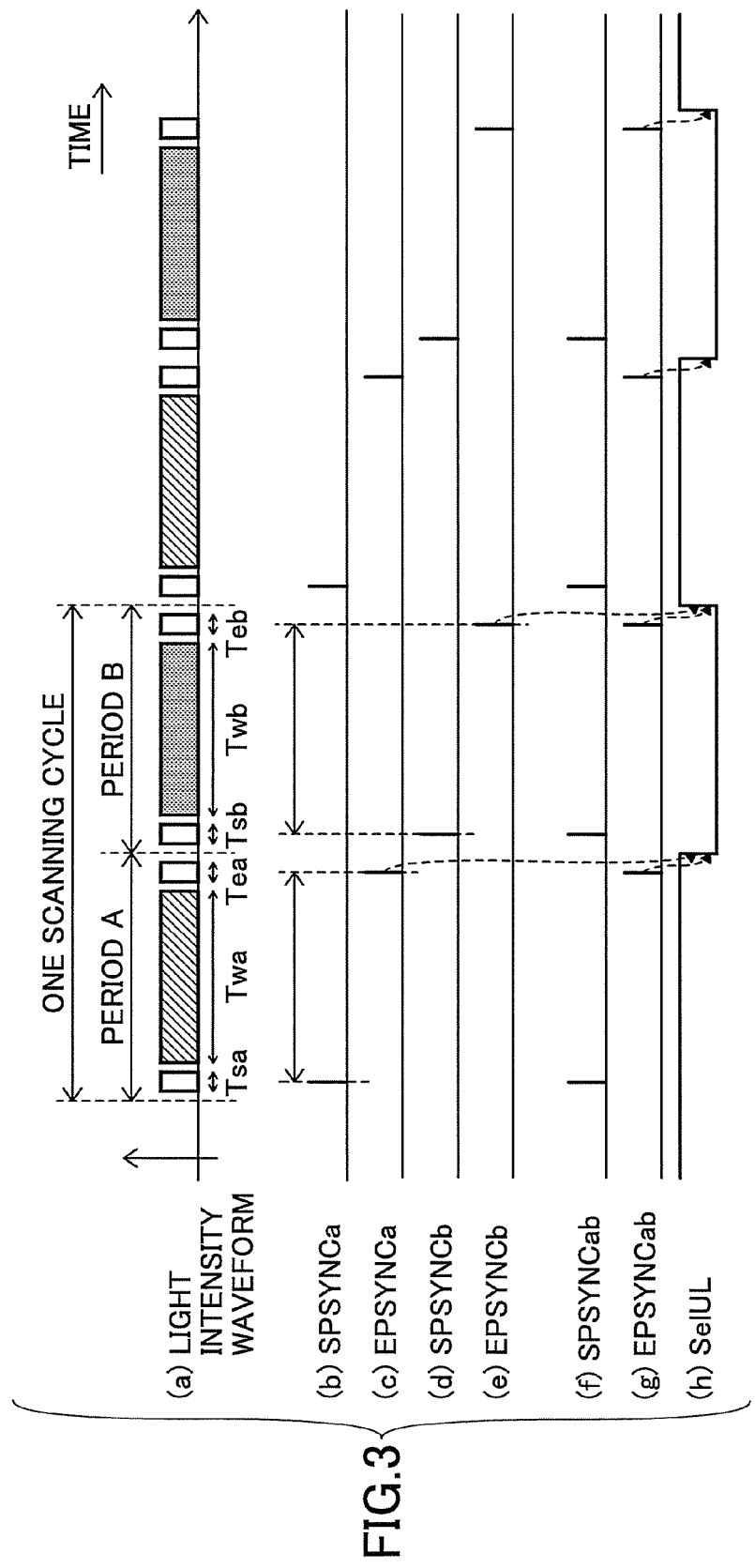
FIG. 3 is a timing chart of signals.

FIG. 3 is a timing chart of signals described above with reference to FIGS. 1 and 2. Signals related to the pixel clock generating unit 111a are shown in FIG. 3. The descriptions below may also apply to the pixel clock generating unit 111c.

In FIG. 3, the horizontal axis indicates time, (a) indicates a light intensity waveform of the semiconductor laser 901a driven by the laser driving unit 114a, and (b) through (e) indicate the synchronization signals SPSYNCa, EPSYNCa, SPSYNCb, and EPSYNCb detected by the PDs 108a, 109a, 108b, and 109b.

As described above, the surfaces of the upper and lower polygon mirrors 907a and 907b of the optical deflector 907 are shifted from each other in the rotational direction. Two laser beams deflected by the upper and lower polygon mirrors 907a and 907b scan the optical scanning positions 911a and 911b at different timings. In FIG. 3, a period A indicates a period of time for which the optical scanning position 911a is scanned and a period B indicates a period of time for which the optical scanning position 911b is scanned. The sum of the periods A and B corresponds to one scanning cycle and the scanning cycle is repeated.

In the period A, a segment Twa represented by a shaded rectangle corresponds to the image area in the optical scanning position 911a. During the segment Twa, one line of modulation data for forming an image on the photoconductor drum 157a is generated and the semiconductor laser 901a is driven according to the modulation data. During segments Tsa and Tea represented by rectangles, the semiconductor laser 901a is forcibly turned on near the PDs 108a and 109a in the optical scanning position 911a to generate the first synchronization signal SPSYNCa and the second synchronization signal EPSYNCa.

Similarly, in the period B, a segment Twb represented by a shaded rectangle corresponds to the image area in the optical scanning position 911b. During the segment Twb, one line of modulation data for forming an image on the photoconductor drum 157b is generated and the semiconductor laser 901a is driven according to the modulation data. Also, during segments Tsb and Teb represented by rectangles, the semiconductor laser 901a is forcibly turned on near the PDs 108b and 109b in the optical scanning position 911b to generate the first synchronization signal SPSYNCb and the second synchronization signal EPSYNCb.

Also in FIG. 3, (h) indicates an indicator signal SelUL that indicates either the period A or the period B. As described later, the pixel clock generating unit 111a performs processing based on the indicator signal SelUL. Assuming that the period A corresponds to the HIGH level of the indicator signal SelUL and the period B corresponds to the LOW level of the indicator signal SelUL, the indicator signal SelUL becomes LOW when the synchronization signal EPSYNCa is detected and becomes HIGH when the synchronization signal EPSYNCb is detected.

In this embodiment, photodetectors (108a, 108b, 109a, and 109b) are provided for each of the optical scanning positions 911a and 911b. Alternatively, photodetectors may be provided for one of the optical scanning positions 911a and 911b, and the laser beam for the other one of the optical scanning positions 911a and 911b may be deflected by using mirrors to enter the photodetectors. With this configuration, as indicated by (f) in FIG. 3, a first synchronization signal SPSYNCab is generated by logical addition of SPSYNCa and SPSYNCb. Similarly, a second synchronization signal EPSYNCab is generated by logical addition of EPSYNCa and EPSYNCb as indicated by (g) in FIG. 3. In this case, whether the synchronization signals SPSYNCab and EPSYNCab correspond to the optical scanning position 911a or the optical scanning position 911b is determined based on the indicator signal SelUL. Also in this case, the indicator signal SelUL may be switched between HIGH and LOW every time the second synchronization signal EPSYNCab is detected. As still another configuration, only one of the photodetectors 108a and 108b and the photodetectors 109a and 109b may be replaced with one photodetector.

<Pixel Clock Generating Unit 111>

Details of the pixel clock generating unit 111 are described below.

Figure 4:
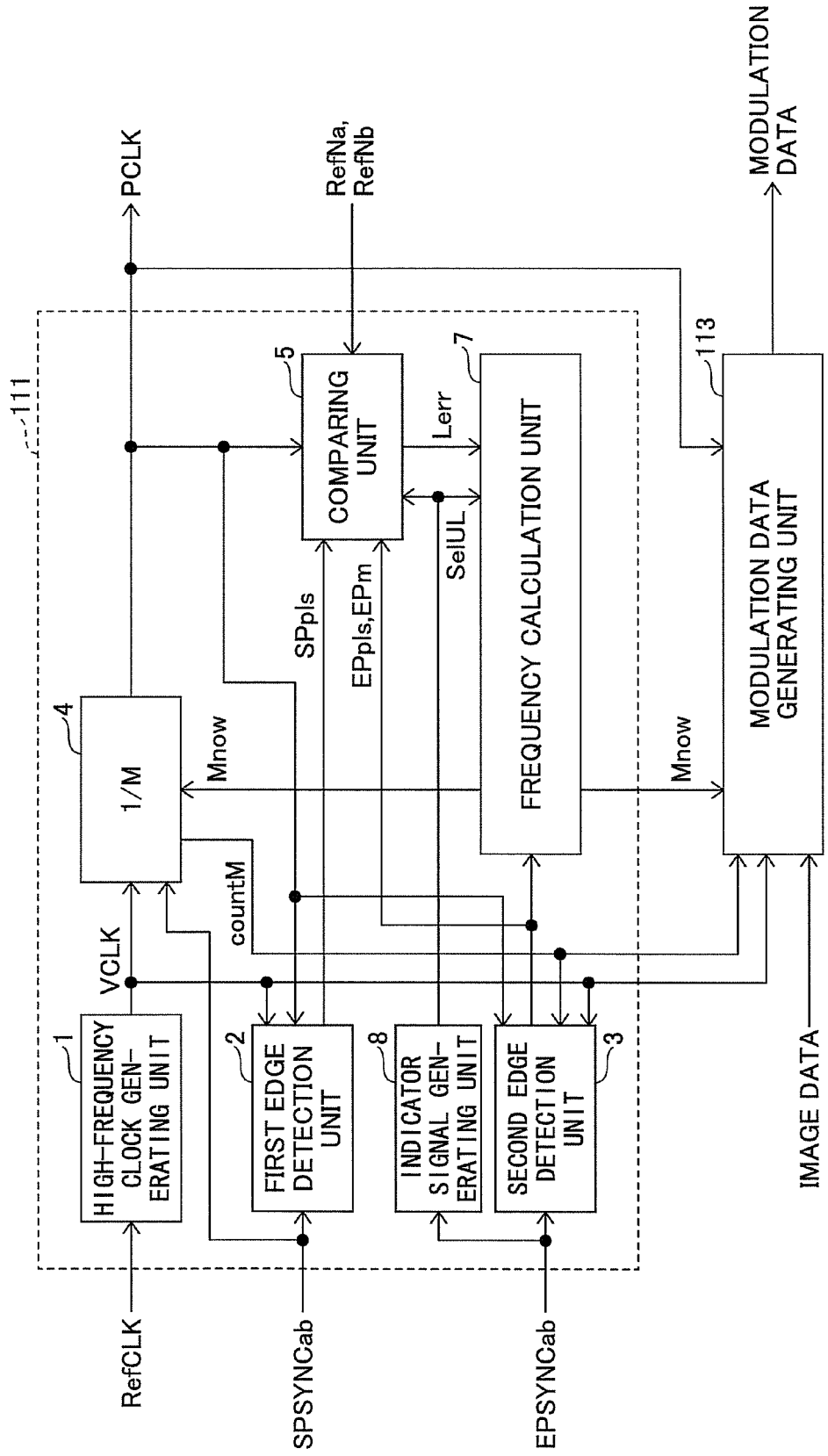
FIG. 4 is a drawing illustrating an exemplary configuration of a pixel clock generating unit.

FIG. 4 is a drawing illustrating an exemplary configuration of the pixel clock generating unit 111. Although the pixel clock generating unit 111a is used in the descriptions below, the descriptions also apply to the pixel clock generating unit 111c.

A high-frequency clock generating unit 1 of the pixel clock generating unit 111 is implemented by a phase locked loop (PLL) and generates a high-frequency clock signal VCLK by multiplying the frequency of a reference clock signal RefCLK.

To generate the high-frequency clock signal VCLK with high accuracy, the reference clock signal RefCLK is preferably generated by a high-precision crystal oscillator. The pixel clock signal PCLK is generated based on the high-frequency clock signal VCLK. A frequency divider 4 functions as a pixel clock generating unit that generates the pixel clock signal PCLK with a frequency obtained by dividing the frequency of the high-frequency clock signal VCLK by "M" (frequency dividing ratio). The frequency divider 4 is implemented by, for example, an M-decimal counter and outputs a value countM. The frequency divider 4 may be configured to start counting at the rising edge of the first synchronization signal SPSYNCab to generate a pixel clock signal that is phase-locked to the start time of scanning.

The frequency dividing ratio M (may also be called the frequency dividing ratio Mnow) of the frequency divider 4 is changed according to a pixel clock frequency specification signal Mnow from a frequency calculation unit 7. Since the pixel clock signal PCLK is generated by frequency-dividing the high-frequency clock signal VCLK that oscillates stably and accurately, the pixel clock frequency can be instantaneously and stably changed by changing the frequency dividing ratio M (or Mnow). This in turn makes it possible for the pixel clock generating unit 111 to quickly respond even when the frequency of the pixel clock signal PCLK is changed line by line.

A first edge detection unit 2 detects a rising edge of the first synchronization signal SPSYNCab based on the high frequency clock signal VCLK. When the rising edge is detected, the first edge detection unit 2 outputs a detection pulse SPpls synchronized with the pixel clock signal PCLK. In the example of FIG. 4, the first synchronization signal SPSYNCab obtained by logical addition of the first synchronization signals SPSYNCa and SPSYNCb is input to the first edge detection unit 2. Alternatively, both the first synchronization signals SPSYNCa and SPSYNCb may be input to the first edge detection unit 2 and the first edge detection unit 2 may be configured to detect rising edges of the first synchronization signals SPSYNCa and SPSYNCb.

A second edge detection unit 3 detects a rising edge of the second synchronization signal EPSYNCab based on the high-frequency clock signal VCLK and outputs a detection pulse EPpis. The second edge detection unit 3 also outputs a count EPm to a comparing unit 5. The count EPm is a count of cycles of the high-frequency clock signal VCLK counted by the frequency divider 4, but is less than one cycle of the pixel clock signal PCLK. Similarly to the first edge detection unit 2, both of the second synchronization signals EPSYNCa and EPSYNCb may be input to the second edge detection unit 3.

An indicator signal generating unit 8 generates the indicator signal SelUL indicating either the period A or the period B. Each time when the rising edge of the second synchronization signal EPSYNCab is detected, the indicator signal generating unit 8 alternately switches the indicator signal SelUL to HIGH or LOW. The indicator signal generating unit 8 switches the indicator signal SelUL to HIGH or LOW after a predetermined period of time from when the rising edge of the second synchronization signal EPSYNCab is detected (e.g., immediately after the rising edge of the second synchronization signal EPSYNCab) so that the indicator signal SelUL is switched during a period between the detection timings of EPSYNC and SPSYNC. Instead of the second synchronization signal EPSYNCab, the first synchronization signal SPSYNCab may be input to the indicator signal generating unit 8.

The comparing unit 5 performs different calculations depending on whether the indicator signal SelUL is HIGH or LOW (i.e., the polarity of the indicator signal SelUL). During the period A, the comparing unit 5 measures time Tline between the first and second synchronization signals SPSYNCa and EPSYNCa, calculates the difference between the time Tline and reference time that is predetermined according to the writing frequency and the distance between the PD 108a and the PD 109a, and outputs the difference as an error Lerr of the current line (or target line). In other words, the difference between ideal scanning time (reference time) and actual scanning time (time Tline) actually taken to scan a line is obtained as an error in the scanning speed.

The time Tline may be counted based on the high frequency clock signal VCLK. However, since the high-frequency clock signal VCLK has a very high frequency, the number of bits used for counting the time Tline becomes very large. Therefore, calculating the time Tline based on the high frequency clock signal VCLK has a disadvantage in terms of the circuit size and power consumption. For this reason, in this embodiment, the time Tline is counted based on the pixel clock signal PCLK with a one-Mth frequency of the high frequency clock signal VCLK and is compared with a reference value (target value) RefNa representing the reference time to calculate the difference. Then, the difference is converted into the error Lerr that is based on the high-frequency clock signal VCLK.

During the period B, the comparing unit 5 measures time Tline between the first and second synchronization signals SPSYNCb and EPSYNCb, calculates the difference between the time Tline and reference time represented by a reference value (target value) RefNb, and outputs the difference as an error Lerr of the current line. In the example of FIG. 4, the first edge detection unit 2 detects the rising edge of the signal SPSYNCab obtained by logical addition of the first synchronization signals SPSYNCa and SPSYNCb and outputs the detection pulse SPpls. Therefore, the comparing unit 5 determines whether the detection pulse SPpls indicates the rising edge of the first synchronization signal SPSYNCa or the first synchronization signal SPSYNCb based on the polarity of the indicator signal SelUL. Similarly, the comparing unit 5 determines whether the detection pulse EPpls indicates the rising edge of the second synchronization signal EPSYNCa or the second synchronization signal EPSYNCb based on the polarity of the indicator signal SelUL <Comparing Unit 5>

Figure 5:
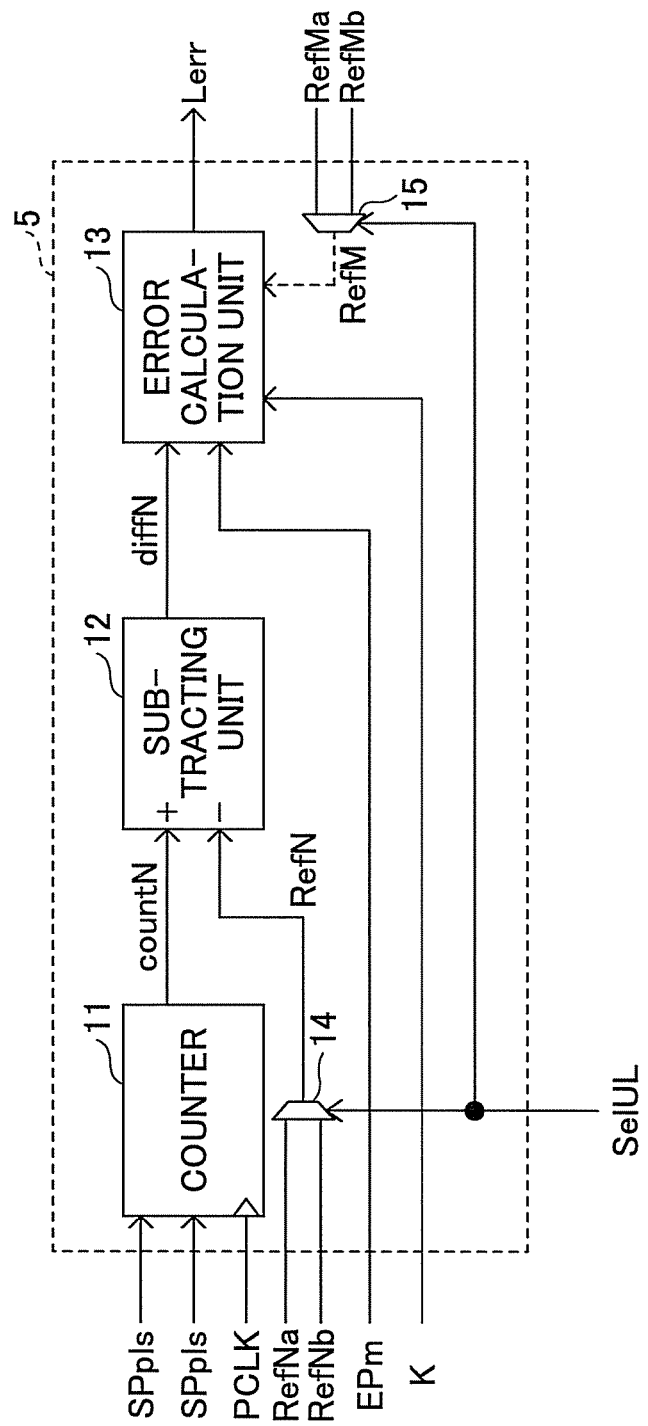
FIG. 5 is a drawing illustrating an exemplary configuration of a comparing unit.

FIG. 5 is a drawing illustrating an exemplary configuration of the comparing unit 5. A counter 11 counts the number of cycles of the pixel clock signal PCLK. The counter 11 is reset to 0 by the detection pulse SPpls input from the first edge detection unit 2 and stops counting when the detection pulse EPpls is received from the second edge detection unit 3. A selector 14 selects and outputs either the reference value RefNa or the reference value RefNb based on the indicator signal SelUL. A subtracting unit 12 subtracts the reference value RefN (RefNa or RefNb) from a value countN of the counter 11 at the time when the counting is stopped and outputs a result diffN. An error calculation unit 13 performs a calculation according to formula 1 below based on the result diffN from the subtracting unit 12, a frequency setting value K (that is used to convert diffN to a value based on VCLK) of the current line, and the count EPm from the second edge detection unit 3 to obtain the error Lerr that is expressed in units of a cycle Tv of the high-frequency clock signal VCLK. The frequency setting value K is a real number indicating an average of frequency dividing ratios M (or Mnow) set in the frequency divider 4 during one line and is obtained from a setting value storing unit 42 of the frequency calculation unit 7 described later.

$$Lerr = diffN \cdot K + EPm \quad \text{(formula 1)}$$

Here, diffN=countN−RefN, Tp=K·Tv, and Tp indicates the cycle of the pixel clock signal PCLK.

When the reference time RefN is not an integral multiple of a target pixel clock cycle, the reference time RefN may be represented by a fixed-point number or the fractional part of the reference time RefN may be converted into a number of cycles of the high-frequency clock signal VCLK to more accurately control the pixel clock signal frequency. In the latter case, the number of cycles of the high-frequency clock signal VCLK indicating the fractional part is input as a reference value RefM to the error calculation unit 13 and the error calculation unit 13 calculates the error Lerr according to a formula 1' below.

$$Lerr = diffN \cdot K + EPm - RefM \quad \text{(formula 1')}$$

When the formula 1' is used, a selector 15 selects a reference value RefMa or a reference value RefMb based on the indicator signal SelUL and Outputs the selected reference value as the reference value RefM to the error calculation unit 13.

<Frequency Calculation Unit 7>

Referring back to FIG. 4, the frequency calculation unit 7 calculates average error data Err by smoothing errors Lerr, calculates an appropriate pixel clock frequency based on the average error data Err, and outputs a pixel clock frequency specification signal Mnow indicating the calculated pixel clock frequency.

Figure 6:
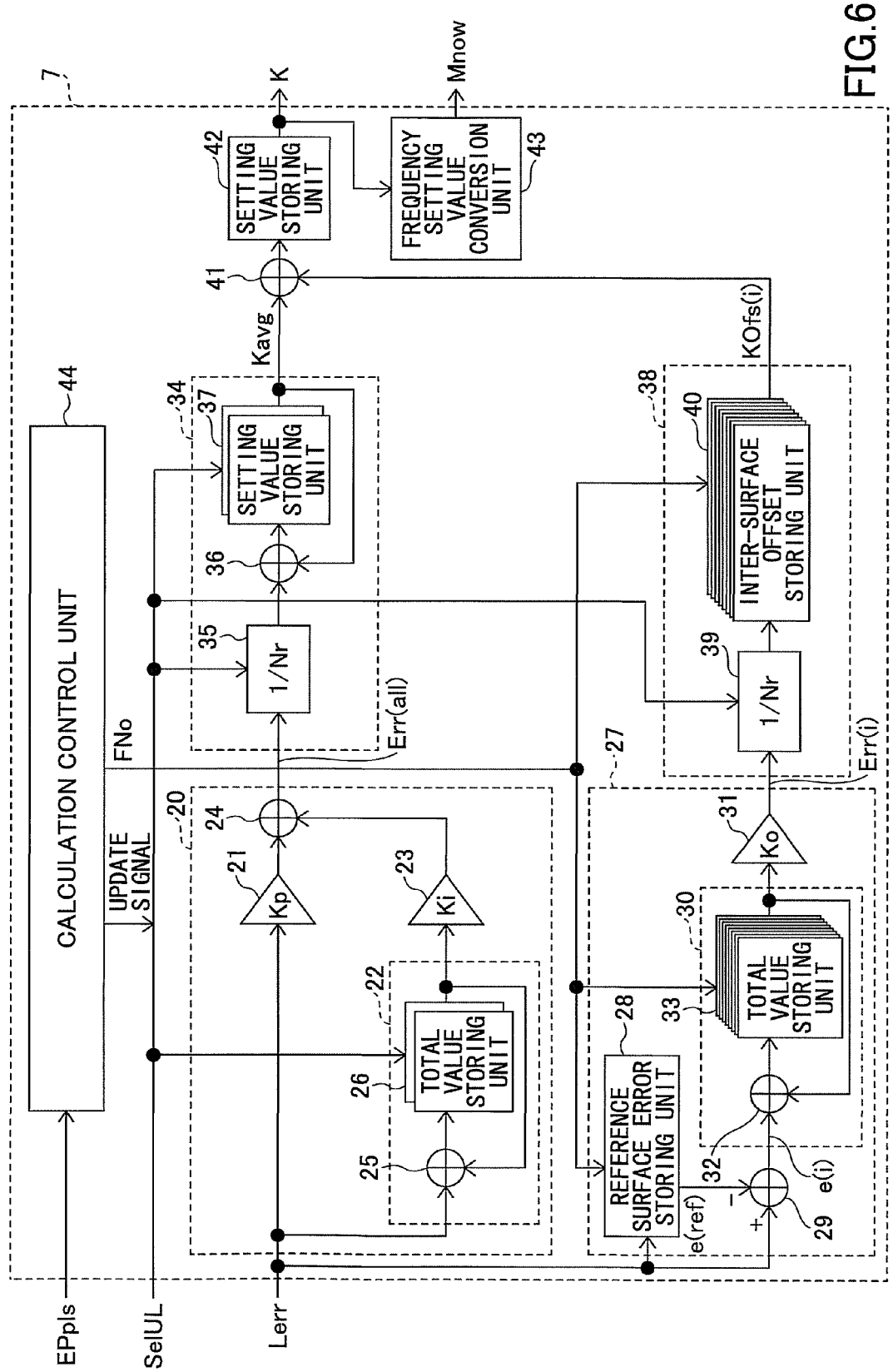
FIG. 6 is a drawing illustrating an exemplary configuration of a frequency calculation unit.

FIG. 6 is a drawing illustrating an exemplary configuration of the frequency calculation unit 7. As illustrated in FIG. 6, the frequency calculation unit 7 includes a surface average error smoothing unit 20, an inter-surface error smoothing unit 27, a surface average frequency calculation unit 34, an inter-surface offset frequency calculation unit 38, an adding unit 41, a setting value storing unit 42, a frequency setting value conversion unit 43, and a calculation control unit 44.

The surface average error smoothing unit 20 outputs surface average error data Err(all) obtained by smoothing errors Lerr calculated for the respective surfaces of each of the upper polygon mirror 907a and the lower polygon mirror 907b of the optical deflector 907. That is, the surface average error smoothing unit 20 outputs surface average error data Err(all) for each of the upper polygon mirror 907a and the lower polygon mirror 907b. The errors Lerr correspond to the errors of lines scanned alternately by the upper polygon mirror 907a and the lower polygon mirror 907b. Therefore, it is possible to determine whether an error Lerr corresponds to the upper polygon mirror 907a or the lower polygon mirror 907b based on the indicator signal SelUL. If the indicator signal SelUL is HIGH, the error Lerr corresponds to the period A (scanning period of the upper polygon mirror 907a); and if the indicator signal SelUL is LOW, the error Lerr corresponds to the period B (scanning period of the lower polygon mirror 907b).

The surface average error smoothing unit 20 includes a multiplying unit 21 that multiplies the error Lerr by a gain Kp, a totaling unit 22 that totals errors Lerr for each of the period A and the period B according to the indicator signal SelUL and selectively outputs a total error value, a multiplying unit 23 that multiplies the total error value from the totaling unit 22 by a gain Ki, and an adding unit 24 that adds output values from the multiplying unit 21 and the multiplying unit 23. Thus, the surface average error smoothing unit 20 is configured to perform proportional-plus-integral (PI) control. The surface average error smoothing unit 20 outputs the result of the adding unit 24 as the surface average error data Err(all).

In the period A, the error Lerr is related to the upper polygon mirror 907a and the total error value output from the totaling unit 22 is also related to the upper polygon mirror 907a. Accordingly, in the period A, the surface average error data Err(all) indicate a surface average error of the upper polygon mirror 907a. Here, the surface average error data Err(all) in the period A (for the upper polygon mirror 907a) is indicated by Erra(all) and the surface average error data Err(all) in the period B (for the upper polygon mirror 907b) is indicated by Errb(all).

The totaling unit 22 includes an adding unit 25 and two total value storing units 26 that are switched according to the indicator signal SelUL. The adding unit 25 receives the error Lerr of the current line and one of two total error values (a total of errors Lerr up to the previous line) output from one of the total value storing units 26 according to the indicator signal SelUL. The adding unit 25 adds the error Lerr and the total error value and updates the total error value stored in the corresponding one of the total value storing units 26 with the addition result.

The inter-surface error smoothing unit 27 calculates a difference e(i) between an error Lerr(0) or Lerr(1) of a reference surface (any one of the surfaces) of the polygon mirror 907 (907a or 907b) and an error Lerr(i) of each surface (i) and smoothes the differences e(i) to obtain inter-surface error data Err(i).

The inter-surface error smoothing unit 27 includes a reference surface error storing unit 28 that stores reference surface errors e(ref) indicating the errors Lerr of the reference surfaces of the upper and lower polygon mirrors 907a and 907b and selectively outputs one of the reference surface errors e(ref); a subtracting unit 29 that outputs a subtraction result (difference) e(i) by subtracting the reference surface error e(ref) from the error Lerr of the current line (surface); a totaling unit 30 that outputs a total value for the corresponding surface (hereafter called a target surface) of the polygon mirror 907 (907a or 907b) by totaling the subtraction results e(i); and a multiplying unit 31 that multiplies the total value by a gain Ko and outputs the result as the inter-surface error data Err(i). Thus, the inter-surface error smoothing unit 27 outputs the inter-surface error data Err(i) for each surface of the upper and lower polygon mirrors 907a and 907b.

The totaling unit 30 selects the target surface based on a surface selection signal FNo input from the calculation control unit 44. For example, when upper and lower polygon mirrors with four surfaces are provided and the upper polygon mirror and the lower polygon mirror is selected alternately as in this embodiment, a value i of the surface selection signal FNo is cyclically incremented from 0 through 7. In this case, values 0, 2, 4, and 6 correspond to the surfaces of the upper polygon mirror and values 1, 3, 5, and 7 correspond to the surfaces of the lower polygon mirror.

Let us assume the reference surface of the upper polygon mirror 907a is indicated by i=0 and the reference surface of the lower polygon mirror 907b is indicated by i=1. The reference surface error storing unit 28 stores errors Lerr received when the value i is 0 or 1 and updates the stored errors Lerr when the value i becomes 0 or 1 next time. Also, the reference surface error storing unit 28 outputs the error Lerr of the reference surface i=0 when the value i is an even number and outputs the error Lerr of the reference surface i=1 when the value i is an odd number. Alternatively, the reference surface error storing unit 28 may be configured to output either the error Lerr of the reference surface i=0 or the error Lerr of the reference surface i=1 according to the indicator signal SelUL.

The totaling unit 30 includes an adding unit 32 and a total value storing unit 33. The total value storing unit 33 includes storing units (eight storing units in this embodiment) that correspond to the surfaces of the upper and lower polygon mirrors 907a and 907b and store total values of inter-surface errors of the corresponding surfaces. The total value storing unit 33 outputs one of the total values corresponding to the surface selection signal FNo. The adding unit 32 adds the subtraction result e(i) from the subtracting unit 29 and the total value of inter-surface errors corresponding to the surface selection signal FNo and updates the total value stored in the total value storing unit 33 with the addition result. When the target surface is the reference surface (i=0 or 1), the subtraction result e(i) is always 0. Therefore, storing units corresponding to the reference surfaces may be omitted and the total value storing unit 33 may be configured to output 0 as the total value of inter-surface errors when the value i is 0 or 1.

The calculation control unit 44 generates the surface selection signal FNo to be sent to the corresponding units of the frequency calculation unit 7 each time when the detection pulse EPpls is received, and generates an update signal requesting the storing units of the frequency calculation unit 7 to update stored values (the timing of sending the update signal varies depending on the storing unit).

The surface average frequency calculation unit 34 includes a multiplying unit 35, an adding unit 36, and a setting value storing unit 37. The multiplying unit 35 multiplies the surface average error data Err(all) by the inverse number of the reference value RefNa or RefNb according to the indicator signal SelUL. The setting value storing unit 37 stores surface average frequency setting values Kavga and Kavgb for the upper and lower polygon mirror 907a and 907b. Each of the surface average frequency setting values Kavga and Kavgb indicates the average of the frequency setting values K applied to the surfaces of the corresponding polygon mirror 907. The setting value storing unit 37 outputs one of the surface average frequency setting values Kavga and Kavgb according to the indicator signal SelUL. The adding unit 36 adds the multiplication result from the multiplying unit 35 to the surface average frequency setting value Kavg (Kavga or Kavgb) output from the setting value storing unit 37 according to the indicator signal SelUL, and updates the surface average frequency setting value Kavg stored in the setting value storing unit 37 with the addition result.

Thus, the surface average frequency calculation unit 34 calculates a next setting value Kavg(n+1) according to a formula 3 below based on the surface average error data Err(all) smoothed for each polygon mirror and a current surface average frequency setting value Kavg(n). In short, the surface average frequency calculation unit 34 calculates the surface average frequency setting value for each of the upper and lower polygon mirrors 907a and 907b according to the indicator signal SelUL.

$$Kavga(n+1)=Kavga(n)+Erra(all)/RefNa$$

$$Kavgb(n+1)=Kavgb(n)+Errb(all)/RefNb \quad \text{(formula 3)}$$

The inter-surface offset frequency calculation unit 38 includes a multiplying unit 39 and an inter-surface offset storing unit 40. The inter-surface offset storing unit 40 includes storing units correspond to the surfaces of the upper and lower polygon mirrors 907a and 907b. Each of the storing units stores an inter-surface offset value KOfs(i) indicating the difference in the frequency setting value K between the reference surface and the corresponding surface of the upper and lower polygon mirrors 907a and 907b. The inter-surface offset storing unit 40 outputs one of the inter-surface offset values KOfs(i) corresponding to the surface selection signal FNo.

The multiplying unit 39 calculates the inter-surface offset value KOfs(i) per pixel by multiplying the inter-surface error data Err(i) by the inverse number of the reference value RefNa or RefNb according to the indicator signal SelUL, and updates the inter-surface offset value KOfs(i) of the target surface stored in the inter-surface offset storing unit 40 with the multiplication result.

Compared with the range of the frequency setting value K, the range of the inter-surface offset value KOfs(i) is normally very narrow. Therefore, storing the surface average frequency setting values Kavg and the inter-surface offset values KOfs(i) instead of storing the (pixel clock) frequency setting values K for the respective surfaces of the upper and lower polygon mirrors 907a and 907b makes it possible to reduce the number of bits of stored values and thereby makes it possible to reduce the circuit size and the power consumption.

As described above, the inter-surface error data Err(i) are obtained by smoothing the difference(s) between the error Lerr of the reference surface and the error Lerr of each surface of the polygon mirror 907a or 907b. In other words, the inter-surface error data Err(i) indicate an error of each surface of the polygon mirror 907 with respect to the reference surface. If other conditions (e.g., the rotational speed of the polygon mirror) are constant, the inter-surface error data Err(i) become substantially constant.

The adding unit 41 adds the surface average frequency setting value Kavga or Kavgb calculated by the surface average frequency calculation unit 34 to the inter-surface offset value KOfs(i) output from the inter-surface offset frequency calculation unit 38 and outputs the result as a frequency setting value K(i). The setting value storing unit 42 stores the frequency setting value K(i) output from the adding unit 41 for each surface of the polygon mirrors 907a and 907b. Thus, the setting value storing unit 42 stores the frequency setting values K(i) obtained by correcting inter-surface errors and outputs one of the frequency setting values K(i) corresponding to the target surface.

Accordingly, the frequency setting value K(i) of the reference surface (i=0 or 1) equals the surface average frequency setting value Kavga or Kavgb and the frequency setting value K(i) of a surface other than the reference surface is represented by Kavg+KOfs(i) Here, Kavg is either Kavga or Kavgb depending on the value i. For example, when the value i is an even number, Kavg=Kavga; and when the value I is an odd number, Kavg=Kavgb.

While the frequency dividing ratio Mnow set in the frequency divider 4 is a natural number, the frequency setting value K is a real number. For this reason, the frequency setting value K has an integer part M and a fixed-point part F with "a" digits (in binary number representation) and is represented by K=M+F/Na where Na=2^a. The frequency setting value conversion unit converts the frequency setting value K to the frequency dividing ratio Mnow to be set in the frequency divider 4. The frequency dividing ratio Mnow is set at M+1 in F cycles out of Na cycles, and is set at M in the remaining cycles so that the frequency dividing ratio Mnow set in the frequency divider 4 becomes close to the frequency setting value K on average. In this case, the round-off error of the frequency setting value K is RefN/Na or RefN/Nb at the maximum and the number of digits "a" is determined such that the round-off error is kept within an acceptable range.

Figure 7:
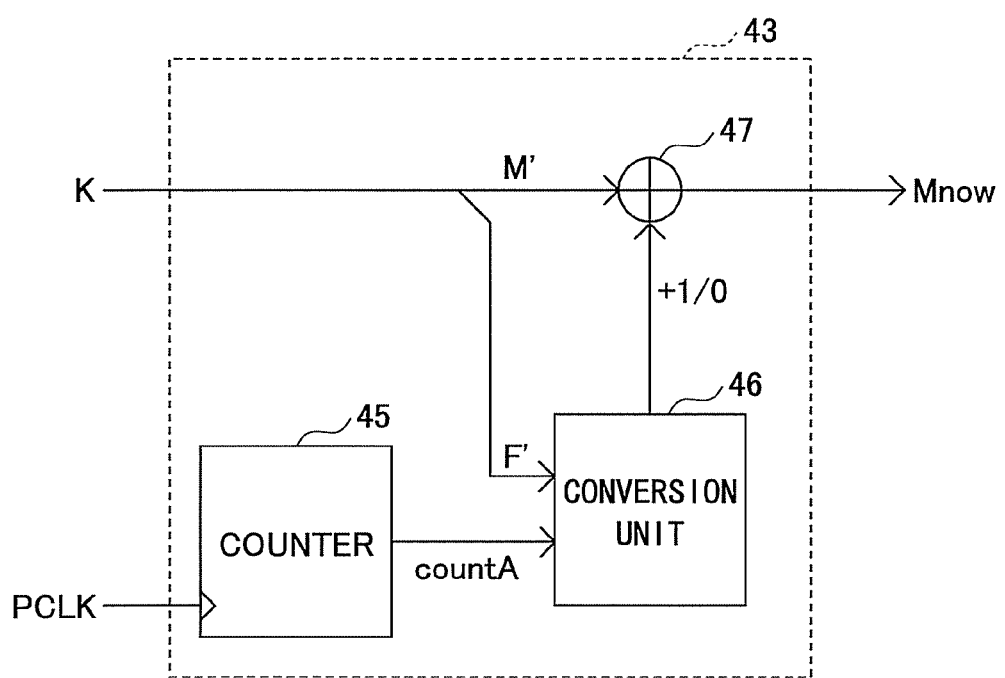
FIG. 7 is a drawing illustrating an exemplary configuration of a frequency setting value conversion unit.

FIG. 7 is a drawing illustrating an exemplary configuration of the frequency value conversion unit 43. As illustrated in FIG. 7, the frequency setting value conversion unit 43 includes an adding unit 47, a counter 45, and a conversion unit 46. The adding unit 47 receives a bit string corresponding to the integral part M of the frequency setting value K, and the conversion unit 46 receives a bit string corresponding to the fixed-point part F of the frequency setting value K. The counter 45 is an "a" bit counter that counts the cycles of the pixel clock signal PCLK and outputs the count as a value countA. Based on the value countA, the conversion unit 46 outputs 1 to the adding unit 47 in F cycles out of Na cycles and outputs 0 to the adding unit 47 in the remaining cycles (Na−F). More specifically, the conversion unit 46 may be configured to output 1 when Arev[0:a−1] obtained by inverting the order of bits of the value countA[a−1:0] is less than the fixed-point part F, and to output 0 when Arev[0:a−1] is greater than or equal to the fixed point part F so that 1 is output evenly in the Na cycles.

The adding unit 47 outputs the frequency dividing ratio Mnow (or the pixel clock frequency specification signal Mnow) that is obtained by adding the integral part M of the frequency setting value K and the value output from the conversion unit 46.

Figure 8:
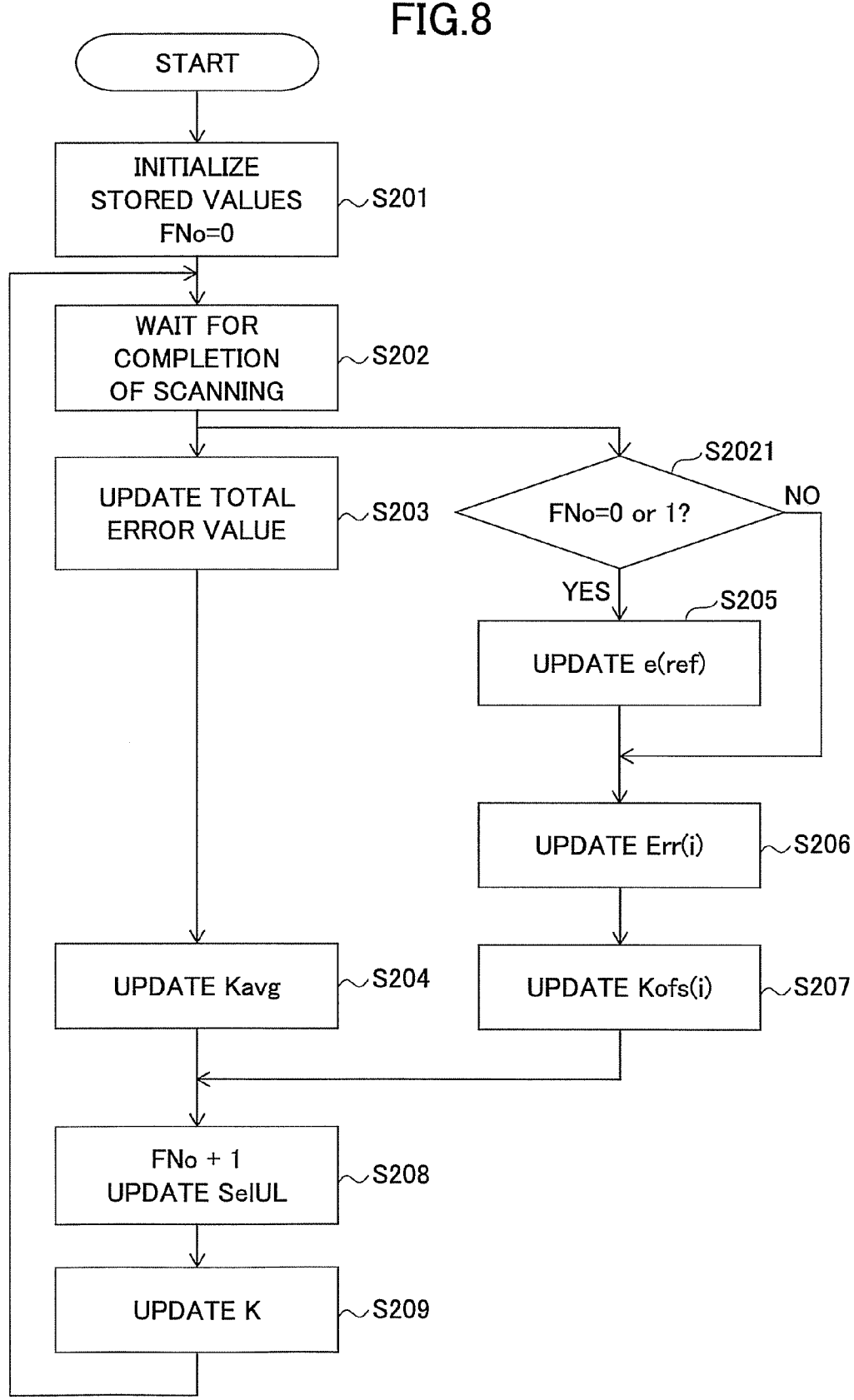
FIG. 8 is a flowchart used to describe a process of calculating a frequency setting value by a frequency calculation unit.

FIG. 8 is a flowchart used to describe a process of calculating the frequency setting value K by the frequency calculation unit 7.

First, the calculation control unit 44 sets the surface selection signal FNo at 0 and thereby initializes stored values in the storing units of the frequency calculation unit 7 (step S201). As a result, the values stored in the total value storing unit 26 and the inter-surface offset storing unit 40 are initialized to 0 and the values stored in the setting value storing units 37 and 42 are initialized to predetermined target frequency setting values. The target frequency setting values are preferably set as accurately as possible. This makes it possible to reduce the pull-in time and to generate signals (e.g., turn-on signals for turning on light sources to generate the synchronization signals SPSYNC and EPSYNC) at desired timing based on the pixel clock signal PCLK. This in turn eliminates the need to provide a wide margin for signal generating timing taking into account the deviation from the frequency setting value K.

Next, the frequency calculation unit 7 waits until the scanning of one line is completed. (step S202). More specifically, the frequency calculation unit 7 waits until the completion of scanning is detected by the calculation control unit 44 based on the detection pulse EPpls. The waiting time also includes the time taken by the comparing unit 5 to calculate the error Lerr.

When the calculation control unit 44 detects the completion of scanning, the totaling unit adds the error Lerr to the total error value (the total of errors Lerr up to the previous line) and updates the total error value stored in one of the total value storing units 26 corresponding to the polygon mirror 907a or 907b according to the indicator signal SelUL (step S203).

Next, the surface average error smoothing unit calculates surface average error data Err(all) according to a formula 4 below.

$$\text{Err(all)} = Kp \cdot \text{Lerr} + Ki \cdot \Sigma \text{Lerr} \quad \text{(formula 4)}$$

In the formula 4, ΣLerr indicates the total error value (total of errors Lerr) of the polygon mirror 907a or 907b corresponding to the indicator signal SelUL.

Based on the calculated surface average error data Err(all), the surface average frequency calculation unit 34 calculates the next surface average frequency setting value Kavg(n+1) and updates the surface average frequency setting value Kavg (step S204).

In parallel with steps S203 and S204, the inter-surface offset value KOfs(i) is updated as described below.

When the completion of scanning is detected by the calculation control unit 44 and the surface selection signal FNo indicates 0 or 1 (YES in step S2021), the reference surface error storing unit 28 updates reference surface error e(refa) or e(refb) with the error Lerr (step S205). The reference surface error storing unit 28 outputs one of the reference surface errors e(refa) and e(refb) as the reference surface error e(ref) according to the indicator signal SelUL.

When the surface selection signal FNo is not 0 and 1, step S205 is skipped. Since the reference surface error e(ref) stored in the reference surface error storing unit 28 is updated after the scanning of the initial line, the initial value of the reference surface error e(ref) may be any value. In other words, it is not necessary to initialize the value of the reference surface error e(ref).

Next, the inter-surface error smoothing unit 27 calculates the inter-surface error data Err(i) ("i" is the surface number indicated by the surface selection signal FNo) of the target surface according to a formula 5 below, and updates the total value of inter-surface errors corresponding to the target surface (i).

$$\text{Err}(i) = Ko \cdot \Sigma e(i) \quad \text{(formula 5)}$$

In the formula 5, Σe(i) indicates the total value of differences e(i) between the error Lerr of the current line and the reference surface error e(ref).

Next, the inter-surface offset frequency calculation unit 38 calculates the inter-surface offset value KOfs(i) based on the inter-surface error data Err(i) and updates the stored inter-surface offset value KOfs(i) (step S207).

After steps S204 and S207 are completed, the calculation control unit 44 increments the value of the surface selection signal FNo by 1 (if FNo=7, the value returns to 0) (step S208).

The indicator signal generating unit 8 switches the indicator signal SelUL to HIGH or LOW after a predetermined period of time from when the rising edge of the second synchronization signal EPSYNC is detected such that the indicator signal SelUL changes at the timing of step S208 (when FNo is incremented). Alternatively, the calculation control unit 44 may be configured to receive the indicator signal SelUL from the indicator signal generating unit 8, to convert the indicator signal SelUL to an indicator signal SelUL' that changes at step S208, and to supply the indicator signal SelUL' to other components of the frequency calculation unit 7.

When the value of the surface selection signal FNo is incremented and the indicator signal SelUL changes, the inter-surface offset frequency calculation unit 38 outputs the inter-surface offset value KOfs(i) for the next line and the surface average frequency calculation unit 34 outputs the surface average frequency setting value Kavg for the next line. Then, the adding unit 41 adds the inter-surface offset value KOfs(i) and the surface average frequency setting value Kavg, and updates the frequency setting value K for the next line (step S209).

The above steps are performed before the scanning of the next line is started (before the first synchronization signal SPSYNCab is detected), i.e., during time other than the effective scanning period.

After step S209, the frequency calculation unit 7 returns to step S202 and repeats the subsequent steps.

<Modulation Data Generating Unit 113>

Figure 9:
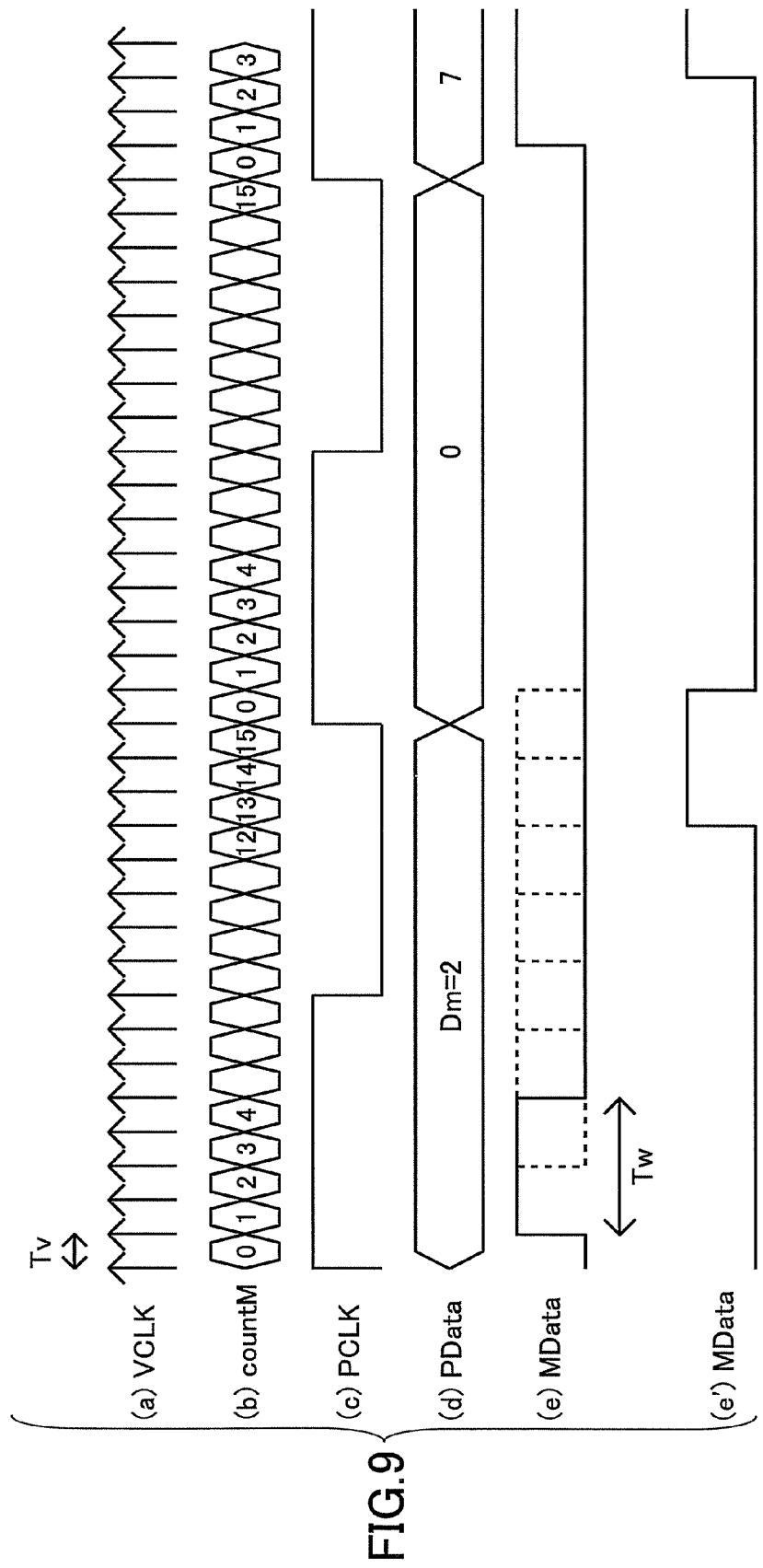
FIG. 9 is a timing chart used to describe operations of a modulation data generating unit.

FIG. 9 is a timing chart used to describe operations of the modulation data generating unit 113. As an example, a process of generating modulation data MData by performing 8-bit pulse-width modulation according to image data PData is described below.

In FIG. 9, (a) indicates rising edges of the high-frequency clock signal VCLK with a cycle Tv and (b) indicates the value countM of the frequency divider 4 on the assumption that the frequency dividing ratio Mnow is 16.

Also in FIG. 9, (c) indicates the pixel clock signal PCLK with a cycle of 16 Tv, (d) indicates the image data PData input in synchronization with the pixel clock signal PCLK, and (e) indicates the modulation data MData a pulse width Tw of which is modulated based on a value Dm of the image data PData.

The modulation data MData is generated based on the high-frequency clock signal VCLK. When Dm≠0 and countM=0, the modulation data MData become HIGH. When countM=Dm/Nm·Mnow (Nm indicates the number of gradation levels, in this example Nm is 8), the modulation data MData become LOW.

Also, the modulation data generating unit 113 may be configured such that the modulation data MData become HIGH when countM=(Nm−Dm)/Nm·Mnow and become LOW when Dm≠0 and countM=0. In this case, modulation data as shown by (e') MData are generated. Further, the modulated data generating unit 113 may be configured to be able to switch between the above two generation modes dot by dot.

As described above, the pixel clock generating unit 111 of this embodiment includes multiple control systems that operate in parallel to correct various types of errors. This configuration makes it possible to accurately generate the pixel clock signal PCLK at high speed.

Also in this embodiment, even when the target value of the same controlled object (e.g., the frequency of the pixel clock signal) changes periodically, a deviation (error Lerr) of a controlled value from the target value is obtained while changing the target value and the deviation is corrected by using multiple control systems that operate in parallel. This configuration makes it possible to accurately control the controlled object.

In a tandem image forming apparatus, it is necessary to control the frequencies of four pixel clock signals corresponding to different optical scanning positions (911a through 911d). In this embodiment, instead of using four pixel clock generating units, the frequencies of four pixel clock signals are controlled using two pixel clock generating units (111a and 111c) and the indicator signal SelUL. This configuration makes it possible to reduce the number of components and the size of the image forming apparatus.

Second Embodiment

Figure 10:
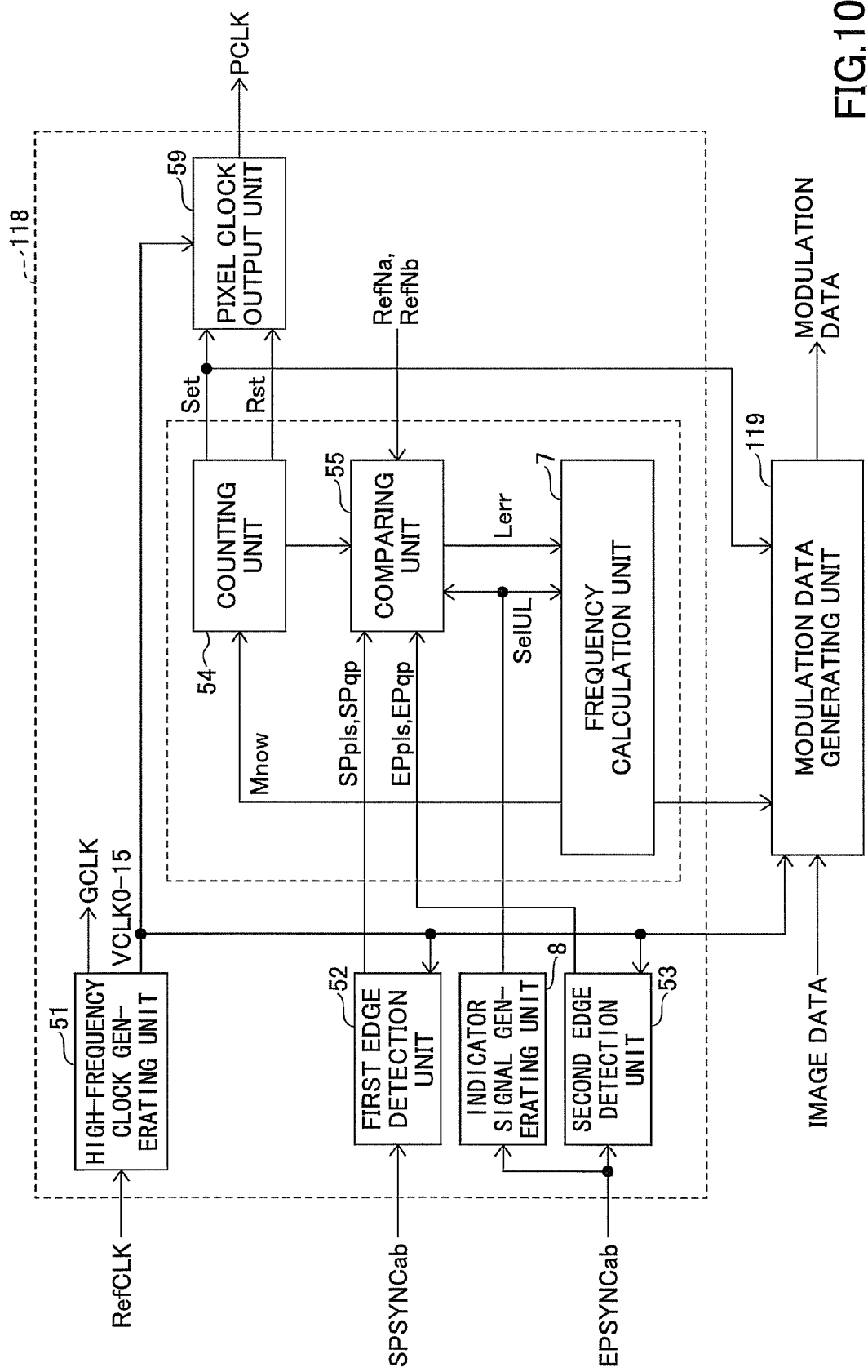
FIG. 10 is a drawing illustrating an exemplary configuration of a pixel clock generating unit according to a second embodiment of the present invention.

FIG. 10 is a drawing illustrating an exemplary configuration of a pixel clock generating unit according to a second embodiment of the present invention. In the second embodiment, as illustrated in FIG. 10, the pixel clock generating unit 111 and the modulation data generating unit 113 of the first embodiment are replaced with a pixel clock generating unit 118 and a modulation data generating unit 119. The same reference numbers as in the first embodiment are assigned to the corresponding components in the second embodiment, and descriptions of those components are omitted here.

The pixel clock generating unit 118 includes a high-frequency clock generating unit 51, a first edge detection unit 52, a second edge detection unit 53, an indicator signal generating unit 8, a counting unit 54, a comparing unit 55, a frequency calculation unit 7, and a pixel clock output unit 59.

The counting unit 54 includes a function to generate a pixel clock signal and the comparing unit 55 includes a function of an error calculation unit.

The high-frequency clock generating unit 51 generates multiphase clock signals with a constant phase difference by multiplying the frequency of a reference clock signal RefCLK. In this embodiment, the high-frequency clock generating unit 51 generates 16-phase multiphase clock signals VCLK0 though VCLK15. The high-frequency clock generating unit 51 also generates an internal operation clock signal GCLK by dividing the frequency of one of the multiphase clock signals VCLK by "Q" (in this example, Q=4) and supplies the internal operation clock signal GCLK to corresponding components in the pixel clock generating unit 118 (lines for supplying the internal operation clock signal GCLK to the components are omitted for brevity). Details of the high-frequency clock generating unit 51 are described later.

Figure 11:
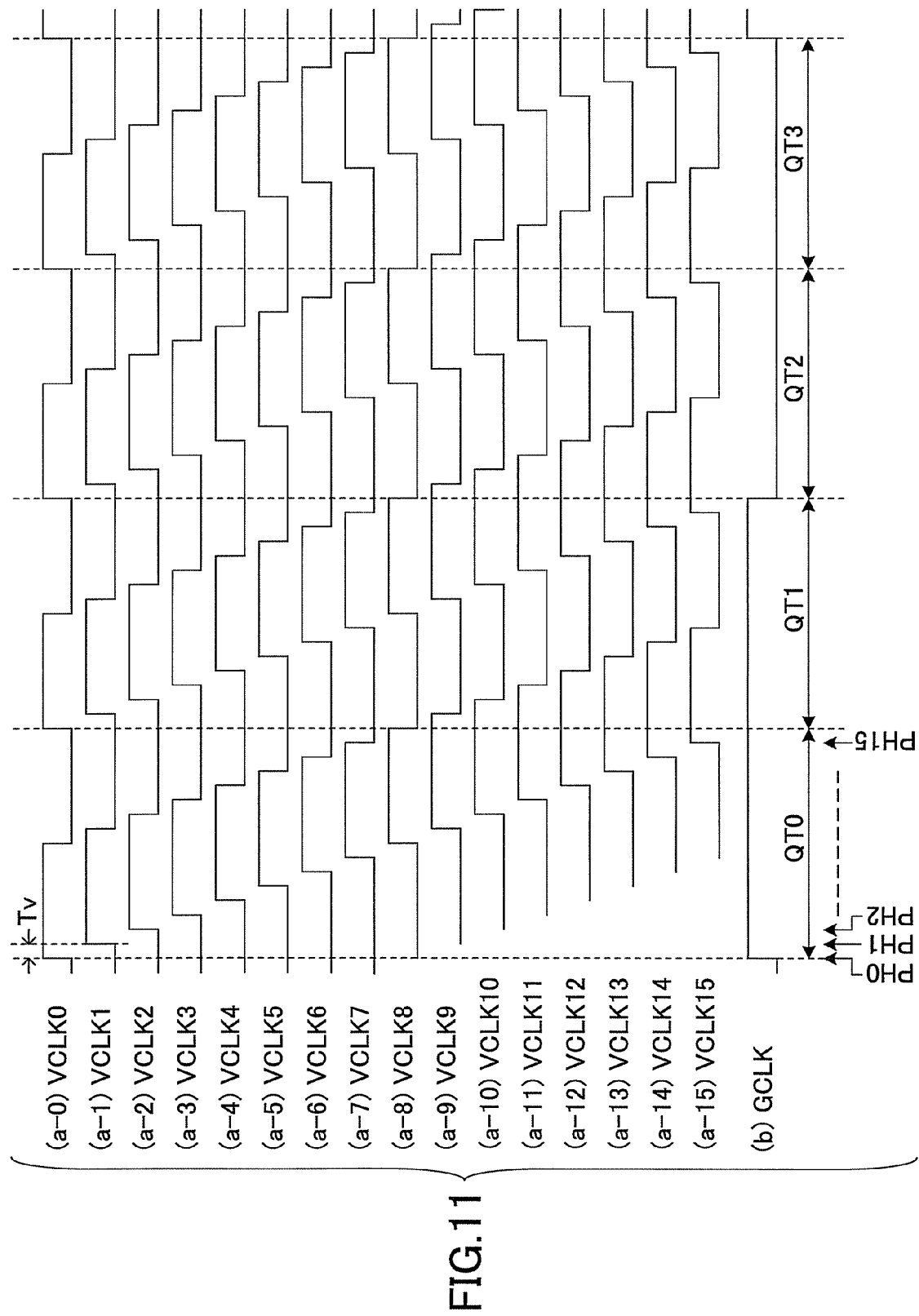
FIG. 11 is a timing chart of clock signals generated by a high-frequency clock generating unit.

FIG. 11 is a timing chart of clock signals generated by the high-frequency clock generating unit 51. In FIG. 11, (a-0) through (a-15) indicate the multiphase clock signals VCLK0 through VCLK15. There is a constant phase difference between the multiphase clock signals VCLK0 through VCLK15. A time interval Tv corresponds to the phase difference. Also in FIG. 11, (b) indicates the internal operation clock signal GCLK obtained by dividing the frequency of (a-0) VCLK0 by four.

The pixel clock generating unit 118 operates based mainly on the internal operation clock signal GCLK. One cycle of the internal operation clock signal GCLK is divided into four periods QT0, QT1, QT2, and QT3. In each of the four periods, PH0 through PH15 indicate timings (or phases) corresponding to the rising edges of the multiphase clock signals VCLK0 through VCLK15. Time information QP indicating time in the internal operation clock signal GCLK is represented by a combination of one of the periods QT0, QT1, QT2, and QT3 and one of the phases PH0 through PH15.

Accordingly, the time information QP takes 64 (0-63) values=16 (PH0-PH15)×4 (QT0, QT1, QT2, QT3). In this embodiment, the pixel clock signal PCLK is generated based on the phase difference Tv between the multiphase clock signals VCLK0 through VCLK15. In other words, the pixel clock generating unit 118 calculates the time information QP (QT, PH) based on the internal operation clock signal GCLK and controls the frequency of the pixel clock signal PCLK based on the time information QP.

Referring back to FIG. 10, the first edge detection unit 52 detects the rising edge of the first synchronization signal SPSYNCab based on the multiphase clock signals VCLK0 through VCLK15. When detecting the rising edge of the first synchronization signal SPSYNCab, the first edge detection unit 52 outputs a detection pulse SPpls that is in synchronization with the internal operation clock signal GCLK and time information SPqp indicating the period QT and the phase PH corresponding to the detected rising edge.

The second edge detection unit 53 detects the rising edge of the second synchronization signal EPSYNCab based on the multiphase clock signals VCLK0 through VCLK15. When detecting the rising edge of the second synchronization signal EPSYNCab, the second edge detection unit 53 outputs a detection pulse EPpls that is in synchronization with the internal operation clock signal GCLK and time information EPqp indicating the period QT and the phase PH corresponding to the detected rising edge.

The counting unit 54 measures time based on the pixel clock frequency specification signal Mnow output from the frequency calculation unit 7. The counting unit generates Set signals each time when the time indicated by the pixel clock frequency specification signal Mnow passes and generates Rst signals after one half of the time indicated by the pixel clock frequency specification signal Mnow from when the Set signals are generated. The Set signals include a SETpls signal synchronized with the internal operation clock signal GCLK and time information SETqp, and the Rst signals include an RSTpls signal synchronized with the internal operation clock signal GCLK and time information RSTqp. The counting unit 54 measures the time in units of the phase difference Tv of the multiphase clock signals VCLK0 through VCLK15. Details of the counting unit 54 are described later.

The pixel clock output unit 59 generates the pixel clock signal PCLK that is HIGH or LOW according to the Set signals and the Rst signals from the counting unit 54 and outputs the generated pixel clock signal PCLK.

In other words, the pixel clock signal PCLK is generated by dividing the frequency of a (high-frequency) clock signal with a cycle corresponding to the phase difference Tv of the multiphase clock signals by the frequency dividing ratio indicated by the pixel clock frequency specification signal Mnow.

Similarly to the comparing unit 5 of the first embodiment, the comparing unit 55 performs different calculations depending on whether the signal SelUl is HIGH or LOW (i.e., the polarity of the indicator signal SelUL). During the period A, the comparing unit 55 measures time Tline between the first and second synchronization signals SPSYNCa and EPSYNCa, calculates the difference between the time Tline and reference time RefNa that is predetermined according to the writing frequency and the distance between the PD 108a and the PD 109a, and outputs the difference as an error Lerr of the current line.

During the period B, the comparing unit 55 measures time Tline between the first and second synchronization signals SPSYNCb and EPSYNCb, calculates the difference between the time Tline and reference time RefNb that is predetermined according to the writing frequency and the distance between the PD 108b and the PD 109b, and outputs the difference as an error Lerr of the current line. In other words, the comparing unit 55 calculates the difference between ideal scanning time (reference time RefN) and the time Tline actually taken to scan the current line as an error in the scanning speed.

The comparing unit 55 counts the number of SETpls input during the time from the reception of SPpls to the reception of EPpls, compares the counted number of SETpls with the reference value RefNa or RefNb, and obtains the error Lerr of the current line, which is expressed in units of the phase difference Tv, based on the comparison result and the time information SPqp and EPqp.

<High-Frequency Clock Generating Unit 51>

Figure 12:
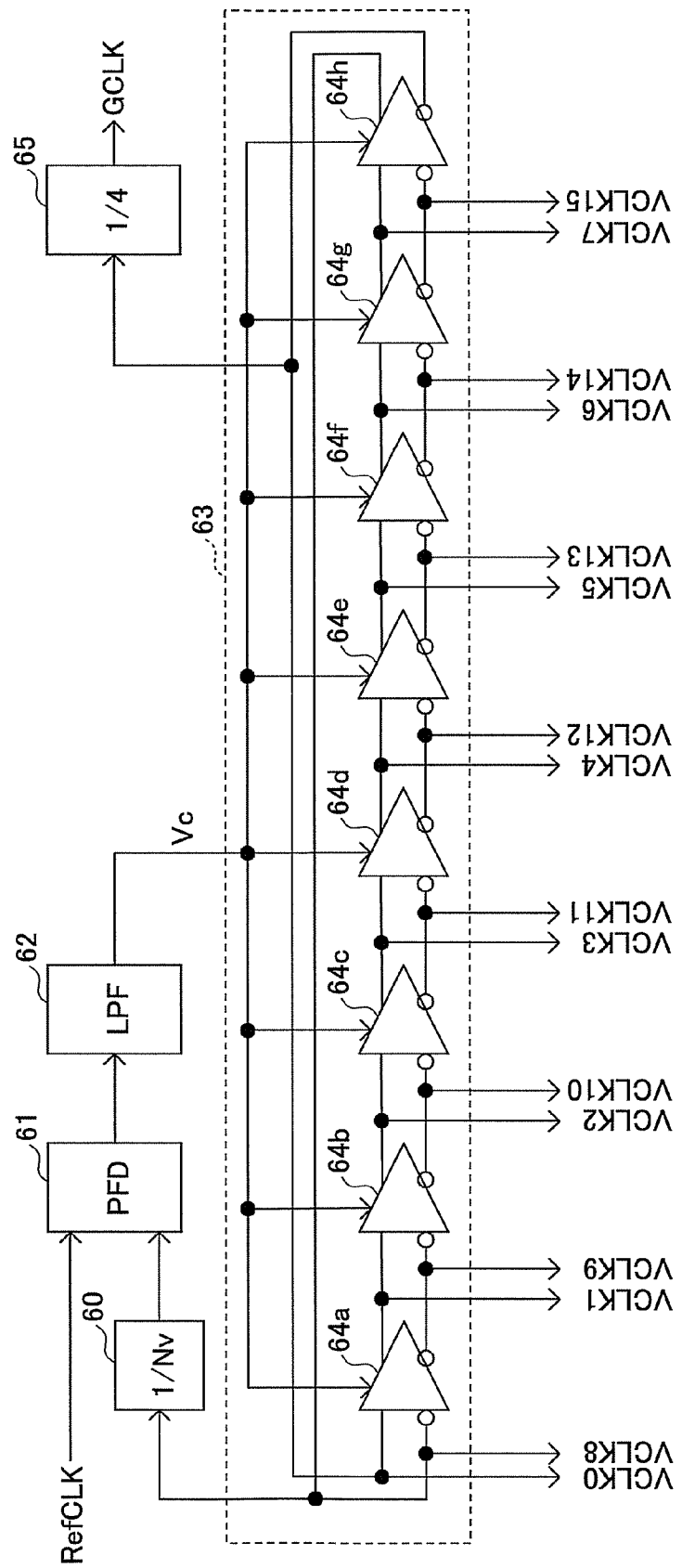
FIG. 12 is a drawing illustrating an exemplary configuration of a high-frequency clock generating unit.

FIG. 12 is a drawing illustrating an exemplary configuration of the high-frequency clock generating unit 51. The high-frequency clock generating unit 51 generates the multiphase clock signals VCLK0 through VCLK15 and the internal operation clock signal GCLK from the reference clock signal RefCLK.

A voltage-controlled oscillator VCO 63 is a ring oscillator including eight differential buffers 64a through 64h connected to each other and generates 16-phase multiphase clock signals VCLK0 through VCLK15. A frequency divider 60 divides the frequency of one of the multiphase clock signals VCLK (in this example, VCLKB) by "Nv". A phase frequency comparator PFD 61 performs phase comparison between the reference clock signal RefCLK and the output from the frequency divider 60 and drives an internal charge pump based on the result of the phase comparison.

A low pass filter LPF 62 smoothes the output of the charge pump and supplies a control voltage Vc to the VCO 63. The delay of the differential buffers 64a through 64h of the VCO 63 is changed by the control voltage Vc for phase synchronization control. For example, when the frequency of the reference clock signal RefCLK is 100 MHz and the frequency dividing ratio Nv is 20, the generated multiphase clock signals VCLK0 through VCLK15 have substantially the same phase difference and a frequency of 2 GHz.

A frequency divider 65 generates the internal operation clock signal GCLK by dividing the frequency of one of the multiphase clock signals VCLK (in this example, VCLK0) by "Q" (in this example, Q=4). The number of phases of the multiphase clock signals is not limited to 16 but is preferably the nth power of 2 to simplify the calculation. For the same reason, the frequency dividing ratio Q used to generate the internal operation clock signal GCLK is preferably the nth power of 2.

<Counting Unit 54, Pixel Clock Output Unit 59>

Figure 13:
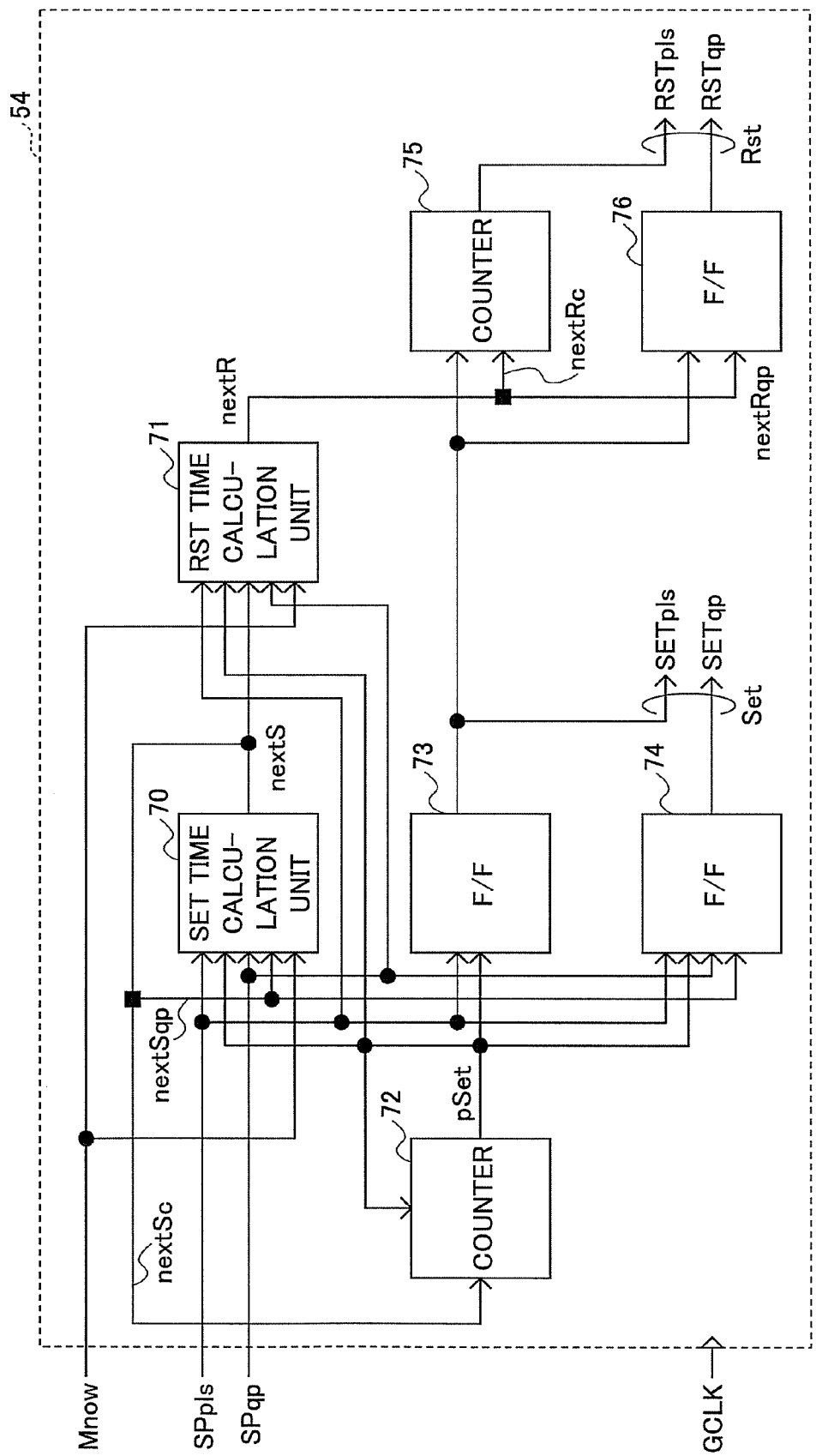
FIG. 13 is a drawing illustrating an exemplary configuration of a counting unit.
Figure 14:
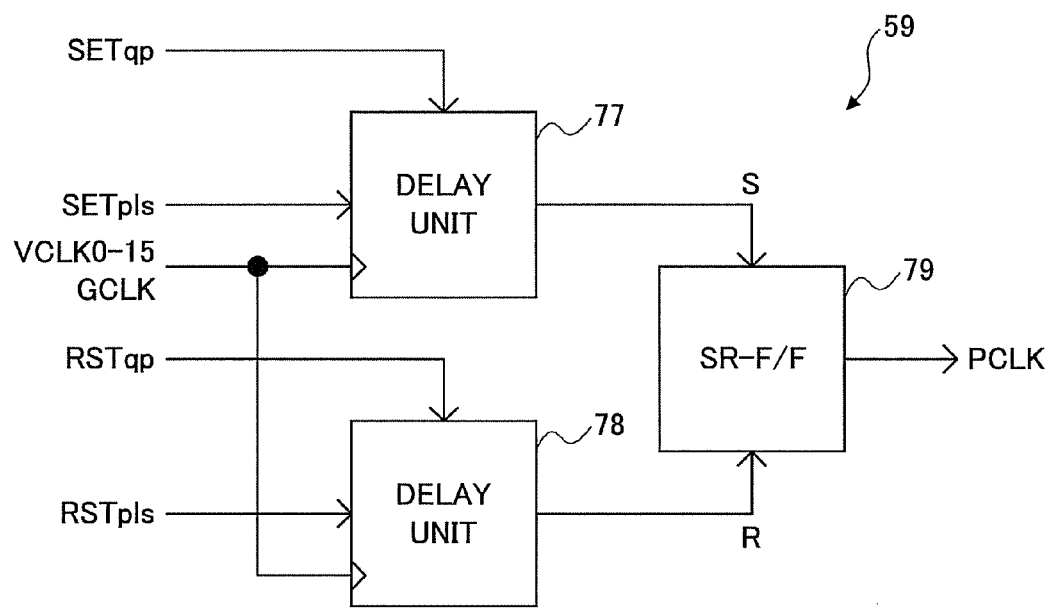
FIG. 14 is a block diagram illustrating an exemplary configuration of a pixel clock output unit.

FIG. 13 is a drawing illustrating an exemplary configuration of the counting unit 54. FIG. 14 is a drawing illustrating an exemplary configuration of the pixel clock output unit 59. An exemplary configuration and process for generating the pixel clock signal PCLK according to the pixel clock frequency specification signal Mnow is described below with reference to FIGS. 13 and 14.

The counting unit 54 includes a SET time calculation unit 70, an RST time calculation unit 71; a counter 72, an F/F 73, an F/F 74, a counter 75, and an F/F 76.

The components of the counting unit 54 illustrated in FIG. 13 operate in synchronization with the internal operation clock signal GCLK. The SET time calculation unit 70 adds the pixel clock frequency specification signal Mnow to current PCLK rise time information indicating the current rise time of the pixel clock signal PCLK and thereby calculates set time information nextS indicating the next rise time of the pixel clock signal PCLK. The set time information nextS is updated in response to a pSet signal.

In FIG. 13, nextSc indicates the quotient of the set time information nextS divided by 64 and nextSqp indicates the remainder. That is, nextSc=nextS[MSB:6] and nextSqp=nextS[5:0]. Since the generation of the pixel clock signal PCLK is started in phase synchronization with the rise of SPSYNC (more precisely, after certain signal processing; in this example, after two cycles of the internal operation clock signal GCLK), SPqp is used as the initial PCLK rise time information.

Similarly, the RST time calculation unit 71 adds one half of the pixel clock frequency specification signal Mnow to the current PCLK rise time information and thereby calculates reset time information nextR indicating the next fall time of the pixel clock signal PCLK. The reset time information nextR is updated in response to the pSet signal. In this case, nextRc=nextR[MSB:6] and nextRqp=nextR[5:0]. In the above calculation, Mnow/2 is added to the current PCLK rise time information so that the duty cycle of the pixel clock signal PCLK becomes about 50%, If the duty cycle of 50% is not essential, any value other than Mnow/2 may be used to simplify the calculation.

A counter 72 counts nextSc cycles of the internal operation clock signal GCLK and generates a pSet signal. When the count matches nextSc, the counter 72 switches the pSet signal to HIGH. When the pSet signal is HIGH, the counter 72 is reset to 1.

The F/F 73 a flip-flop circuit that delays the pSet signal and the SPpls signal by one GCLK cycle to generate the SETpls signal. The F/F 74 is a flip-flop circuit that latches nextSqp when enabled by the pSet signal, latches SPqp when enabled by SPpls, and generates the SETqp signal. The SETpls signal specifies the rise of the pixel clock signal PCLK by a GCLK cycle, and the SETqp signal synchronized with the SETpls signal specifies the rise time information in the GCLK cycle. The SETpls signal and the SETqp signal are called Set signals and are supplied to the pixel clock output unit 59.

A counter 75 counts nextRc cycles based on the internal operation clock signal GCLK and generates an RSTpls signal. When the SETpls signal is HIGH, the counter 75 is reset to 1. The RSTpls signal is switched to HIGH when the count of the counter 75 matches nextRc. The F/F 76 is a flip-flop circuit that latches nextRqp when enabled by SETpls and generates the RSTqp signal. The RSTpls signal specifies the fall of the pixel clock signal PCLK by a GCLK cycle, and the RSTqp signal specifies the fall time information in the GCLK cycle. The RSTpls signal and the RSTqp signal are called Rst signals and are supplied to the pixel clock output unit 59.

Control timings of the components of the counting unit 54 are not limited to those described above as long as the SETqp signal becomes active when the SETpls signal is HIGH and the RSTqp signal becomes active when the RSTpls signal is HIGH.

Referring to FIG. 14, the pixel clock output unit 59 includes delay units 77 and 78 and an SR-F/F 79. The delay unit 77 delays SETpls supplied from the counting unit 54 according to the time information SETqp and outputs the delayed SETpls as a pulse S based on the multiphase clock signals VCLK0 through VCLK15. The delay unit 77 also receives the internal operation clock signal GCLK to identify a period QT in a GCLK cycle. Alternatively, the delay unit 77 may be configured to receive a signal QT indicating the period QT. In this case, the signal QT is generated by the high-frequency clock generating unit 51. In other words, the pulse S is a pulse generated by delaying SETpls for a period of time corresponding to SETqp·Tv.

The delay unit 78 delays RSTpls supplied from the counting unit 54 according to the time information RSTqp and outputs the delayed RSTpls as a pulse R based on the multiphase clock signals VCLK0 through VCLK15. In other words, the pulse R is a pulse generated by delaying RSTpls for a period of time corresponding to RSTqp·Tv.

The SR-F/F 79 is a Set-Reset flip-flop circuit that outputs the pixel clock signal PCLK that is switched (set) to HIGH at the rise of the pulse S and switched (reset) to LOW at the rise of pulse R.

Figure 15:
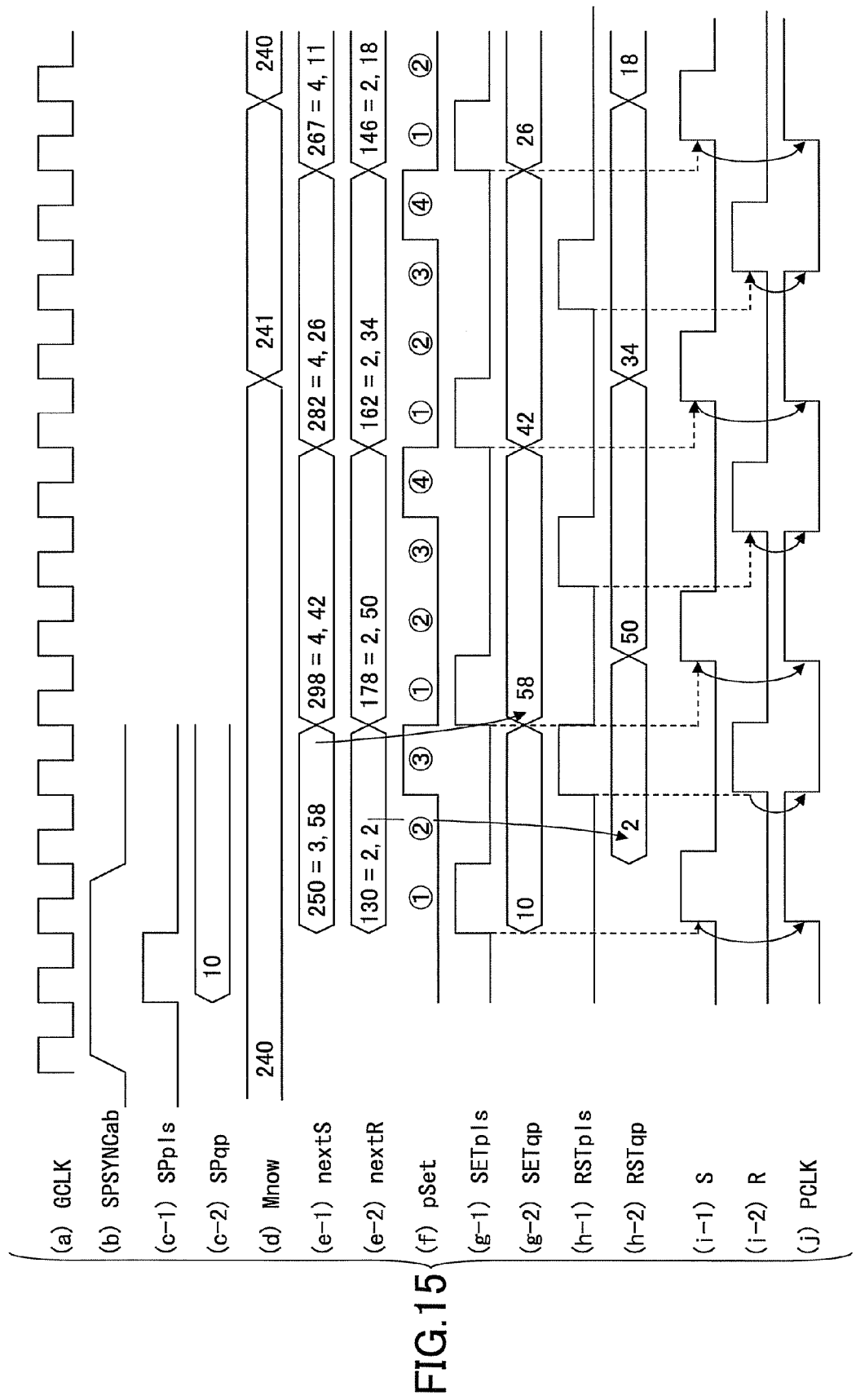
FIG. 15 is a timing chart of signals of a counting unit and a pixel clock signal output unit.

FIG. 15 is a timing chart of signals of the counting unit 54 and the pixel clock output unit 59. In FIG. 15, (a) indicates GCLK, (b) indicates SPSYNCab, (c-1) indicates SPpls, and (c-2) indicates SPqp.

When detecting the rising edge of SPSYNCab, the first edge detection unit 52 outputs the SPpls signal that becomes HIGH during the next GCLK cycle and the SPqp signal indicating the rise time (in this example, 10) of the SPpls signal in the GCLK cycle.

Also in FIG. 15, (d) indicates the pixel clock frequency specification signal Mnow supplied from the frequency calculation unit 7, and (e-1) indicates nextS that is calculated by the SET time calculation unit 70 and indicates the next rise time of the pixel clock signal PCLK.

Since the pixel clock signal PCLK rises in synchronization with the rise of SPSYNCab, the pixel clock signal PCLK rises the next time after SPqp+Mnow=250Tv. In (e-1) nextS, the value before the comma in the right hand side of each equation indicates nextSc and the value after the comma indicates nextSqp. In this example, the second nextS is nextSqp+Mnow=298.

Also, (e-2) indicates nextR calculated by the RST time calculation unit 71 and indicating the next fall time of the pixel clock signal PCLK. The next fall time of PCLK (130) is calculated by adding Mnow/2 to the rise time of SPSYNCab. In (e-2) nextR, the value before the comma in the right hand side of each equation indicates nextRc and the value after the comma indicates nextRqp.

The pulse pSet of (f) is output one GCLK cycle before the rise of the SETpls to update the SETqp signal. The pulse pSet becomes HIGH when the count of the counter 72 matches nextSc. In (f) pSet, circled numbers indicate the counts of nextSc.

The pulse SETpls of (g-1) is obtained by delaying SPpls and pSet by one GCLK cycle. The pulse SETpls specifies the rise of the pixel clock signal PCLK by a GCLK cycle. The PCLK rise time information SETqp of (g-2) indicates a delay value for the pulse SETpls. SETqp is updated with the value of nextSqp at the time when pSet is HIGH.

The pulse RSTpls of (h-1) specifies the rise of the pixel clock signal PCLK by a GCLK cycle. The pulse RSTpls becomes HIGH when the count of the counter 75 matches nextSc. PCLK fall time information RSTqp of (h-2) indicates a delay value for the pulse RSTpls.

A pulse S of (i-1) is obtained by delaying SETpls of (g-1) by the delay value indicated by SETqp of (g-2). The unit of the delay value is the phase difference Tv between the multiphase clock signals VCLK0 through VCLK15.

A pulse R of (i-2) is obtained by delaying RSTpls of (h-1) by the delay value indicated by RSTqp of (h-2). The pixel clock signal PCLK of (j) becomes HIGH at the rise of the pulse S of (i-1) and becomes LOW at the rise of the pulse R of (i-2).

<Comparing Unit 55>

Figure 16:
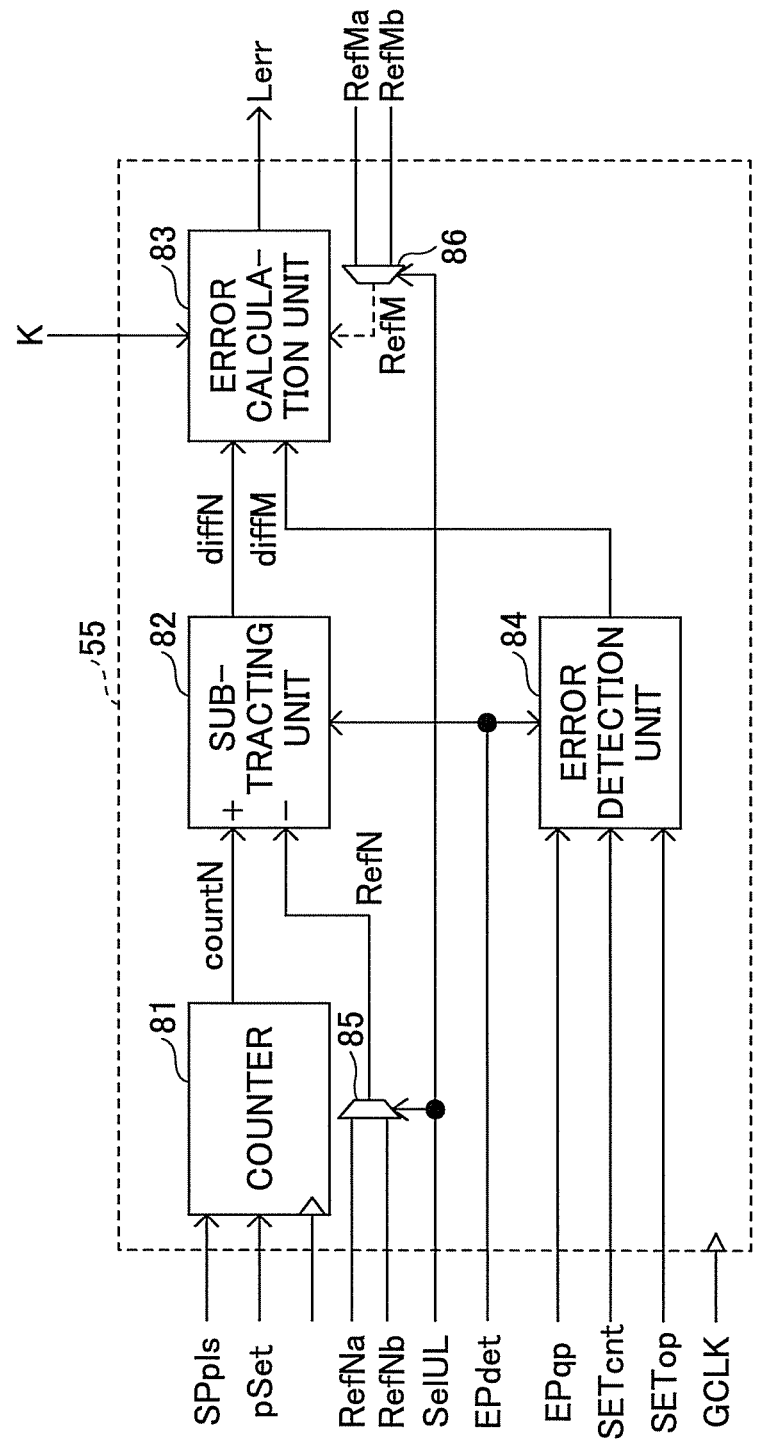
FIG. 16 is a block diagram illustrating an exemplary configuration of a comparing unit.

FIG. 16 is a drawing illustrating an exemplary configuration of the comparing unit 55. The comparing unit 55 includes a counter 81, a subtracting unit 82, an error calculation unit 83, an error detection unit 84, and a selector 85.

The counter 81 is reset to 0 by SPpls and incremented by pSet. The counter 81 outputs a value countN. The selector 85 selects and outputs one of the reference value RefNa and the reference value RefNb based on the indicator signal SelUL as the reference value RefN.

The subtracting unit 82 subtracts the reference value RefN from the value countN (n) of the counter 81 When EPdet is HIGH and outputs the result diffN (=n−RefN).

The error detection unit 84 calculates a phase difference diffM according to the following formula:

$$diffM = Endcnt \cdot Mp + (EPqp - Endqp)$$

In the above formula, Endqp and Endcnt indicate the values of SETqp and SETcnt at the time when EPdet is HIGH.

In the above formula, Endqp and Endcnt indicate SETqp and SETcnt when EPdet is HIGH, and Mp indicates the division number of GCLK time information (in this example, 64).

The error calculation unit 83 calculates and outputs an error Lerr expressed in units of the phase difference Tv of the multiphase clock signals VCLK0 through VCLK15 according to the following formula:

$$Lerr = diffN \cdot K + diffM$$

In the above formula, Tp=K·Tv, and Tp indicates the cycle of the pixel clock signal PCLK.

Similarly to the comparing unit 5 of the first embodiment, the comparing unit 55 may also include a selector 86 that selects the reference value RefMa or the reference value RefMb based on the indicator signal SelUL and outputs the selected reference value as the reference value RefM to the error calculation unit 83. In this case, the error calculation unit 83 calculates the error Lerr according to the following formula: Lerr=diffN·K+diffM−RefM. This configuration makes it possible to more accurately set the reference time and thereby makes it possible to more accurately control the pixel clock signal frequency.

Figure 17:
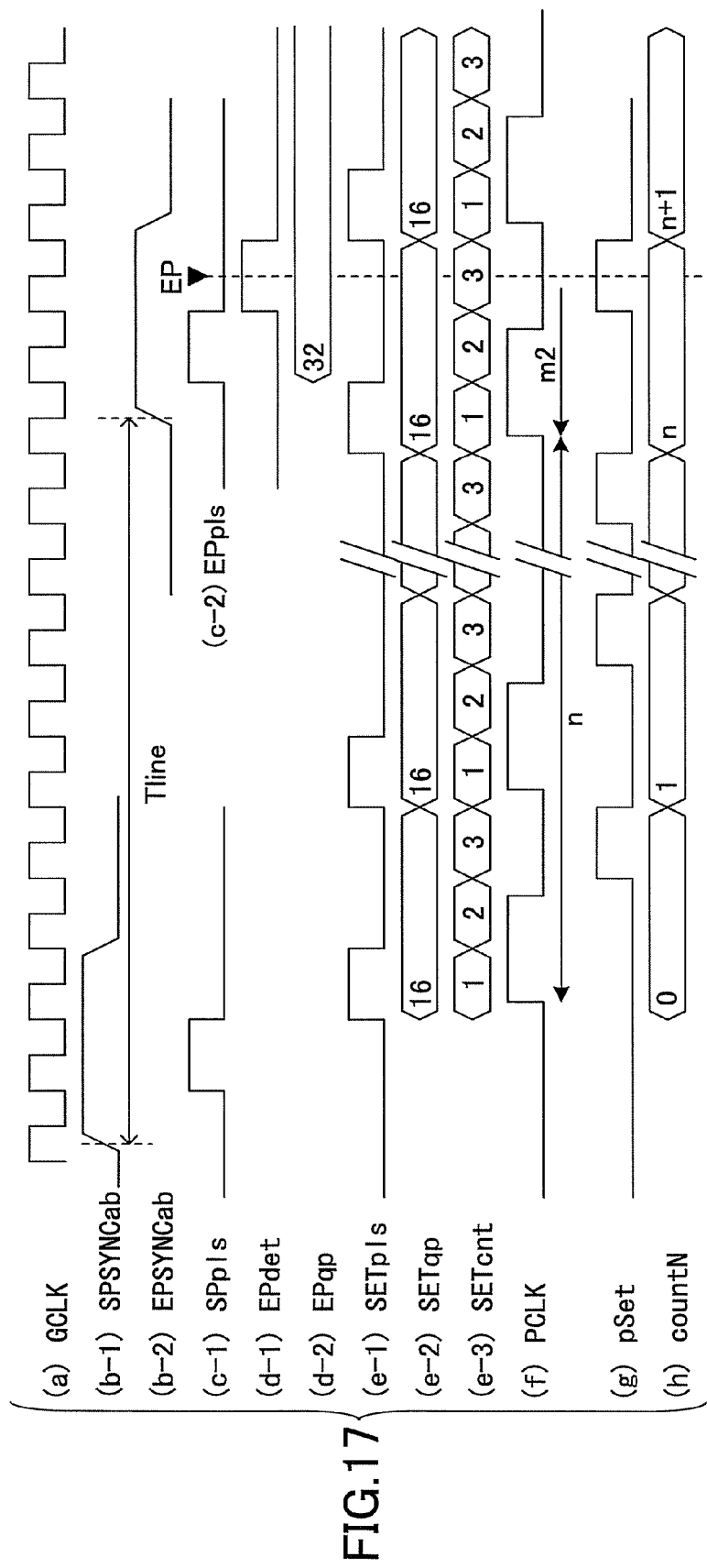
FIG. 17 is a timing chart used to describe operations of a comparing unit.

FIG. 17 is a timing chart used to describe operations of the comparing unit 55. In FIG. 17, (a) indicates GCLK, (b-1) indicates the first synchronization signal SPSYNCab, and (b-2) indicates the second synchronization signal EPSYNCab. Time Tline indicating the scanning time of the current line is represented by the difference between the rise time of SPSYNCab and the rise time of EPSYNCab.

Also in FIG. 17, (c-1) indicates SPpls, (c-2) indicates EPpls, (d-2) indicates time information EPqp of the synchronization signal EPSYCab, (e-1) indicates SETpls, and (e-2) indicates time information SETqp indicating the rise of the pixel clock signal PCLK.

SETcnt of (e-3) indicates the count of the counter 72. In this embodiment, it is assumed that Mnow is fixed at 192 The pixel clock signal PCLK of (f) is generated after two GCLK cycles from the rise of SPSYNCab. Therefore, a scanning end point EP is detected after two GCLK cycles from the rise of EPSYNCab.

Therefore, the error Lerr is obtained based on the corresponding signals at the time when (d-1) EPdet, which is generated by delaying (c-2) EPpls for one GCLK cycle, is HIGH.

Also in FIG. 17, (g) indicates pSet, and (h) indicates countN that is the count of the counter 81. The counter 81 (or the value of countN) is reset to 0 by (c-1) SPpls and is incremented by (g) pSet. Thus, the number of cycles n of the pixel clock signal PCLK from the start of scanning until the scanning end point EP, and a phase error m2 are obtained.

The error Lerr is output to the frequency calculation unit 7 of FIG. 10. Operations of the frequency calculation unit 7 are substantially the same as those in the first embodiment.

<Modulation Data Generation Unit 119>

Figure 18:
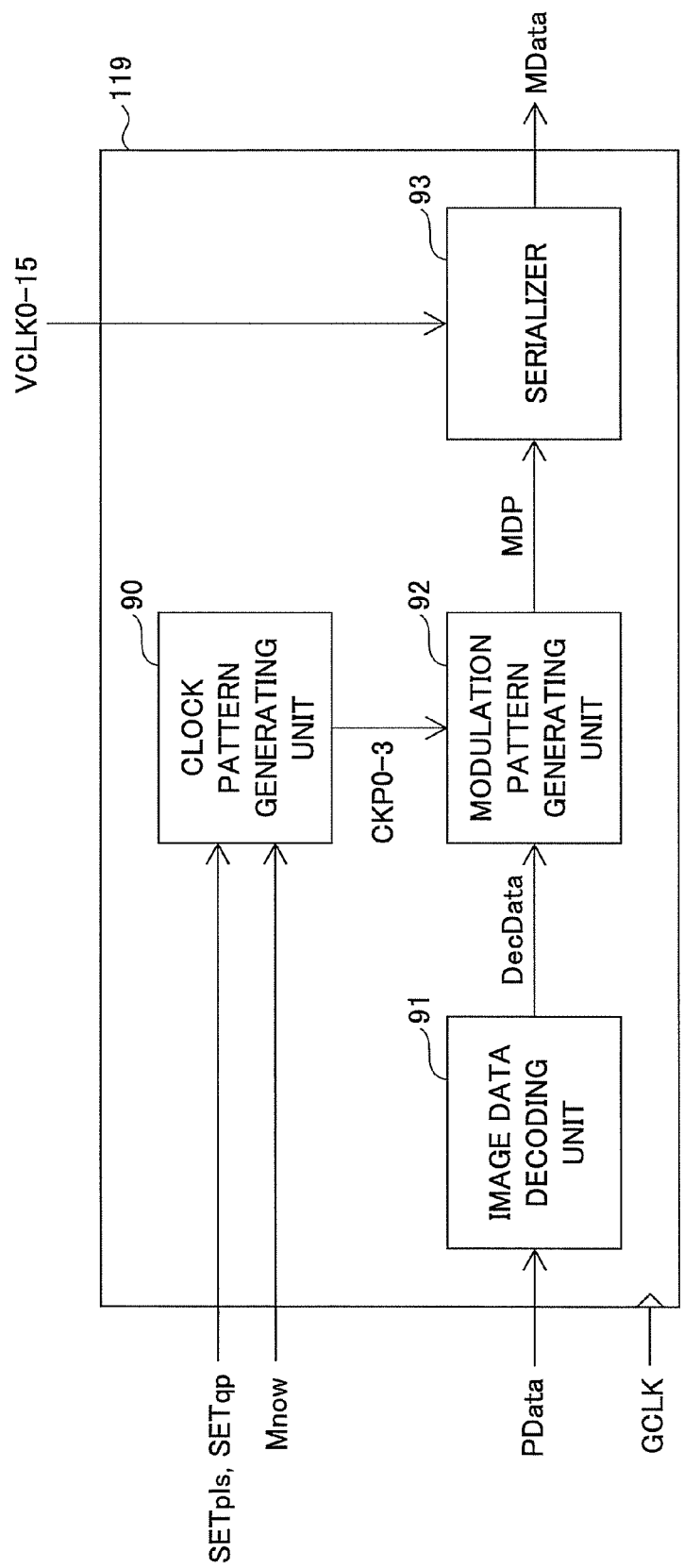
FIG. 18 is a drawing illustrating an exemplary configuration of a modulation data generating unit.

FIG. 18 is a drawing illustrating an exemplary configuration of the modulation data generating unit 119. The components of the modulation data generating unit 119 illustrated in FIG. 18 operate in synchronization with the internal operation clock signal GCLK. The modulation data generating unit 119 includes a clock pattern generating unit 90, an image data decoding unit 91, a modulation pattern generating unit 92, and a serializer 93.

The clock pattern generating unit 90 generates clock pattern signals CKP having predetermined phase differences from the pixel clock signal PCLK based on the Set signals supplied from the counting unit 54 and the pixel clock frequency specification signal Mnow supplied from the frequency calculation unit 7.

In this embodiment, the clock pattern signals CKP include CKP0 through CKP3. The phases of CKP0 through CKP3 are behind the phase of the pixel clock signal PCLK by 0, $\pi/8$, $\pi/4$, and $3\pi/8$, respectively.

Each of the clock pattern signals CKP changes based on GCLK and is 64 bit data corresponding to 64 periods Tqp obtained by dividing one GCLK cycle by the time information QP. When the period Tqp is HIGH, the corresponding bit of the clock pattern signal CKP is 1; and when the period Tqp is LOW, the corresponding bit of the clock pattern signal CKP is 0.

First, the clock pattern generating unit 90 obtains offset data sofs0 through sofs3 indicating the rising edges of the clock pattern signals CKP and offset data rofs0 through rofs3 indicating the falling edges of the clock pattern signals CKP.

In this example, sofs0=SETqp, sofs1=SETofs+Mnow/8, sofs2=SETofs+Mnow/4, and sofs3=SETofs+3Mnow/8; and rofs0 through rofs3 are obtained by adding Mnow/2 to each of the sofs0 through sofs3. Then, the clock pattern generating unit 90 converts, for each GCLK cycle, the bits of the clock pattern signals CKP. In each of the clock pattern signals CKP, bits from MSB to sofs are converted to 0s, bits from sofs to rofs are converted to is, and bits from rofs are converted to 0s. When each set of the offset data is 64 or larger, the clock pattern generating unit 90 delays the above conversion for one GCLK cycle every 64.

For example, when Mnow=192 and SETqp=16, sofs=40 and rofs=136 (=2 GCLK+8) for CKP1. In this case, MSB (=63) to 24th bit in the first GCLK cycle are converted to 0s and 23rd to 0th bits in the first GCLK cycle are converted to is; the bits in the second GCLK cycle are all converted to is; and 63rd to 56th bits in the third GCLK cycle are converted to is and 55th to 0th bits in the third GCLK cycle are converted to 0s.

The image data decoding unit 91 converts the image data PData into 8-bit pulse width modulation data DecData. MSB through LSB of the pulse width modulation data DecData correspond to eight periods obtained by dividing one cycle of the pixel clock signal PCLK.

For example, the image data decoding unit 91 convert PData=3 into DecData='b11100000 ('b indicates binary notation). Alternatively, the image data decoding unit 91 may be configured to convert PData=3 into DecData='b00000111. Also, a mode switching signal may be attached to the image data to switch the modes of the image data decoding unit 91. Any conversion method other than those described above may also be used.

The modulation pattern generating unit 92 generates a modulation pattern signal MDP from the pulse width modulation data DecData and the clock pattern signals CKP0 through CKP3. The modulation pattern signal MDP, similarly to the clock pattern signals CKP, changes based on GCLK and is 64 bit data corresponding to 64 periods Tqp obtained by dividing one GCLK cycle by the time information QP.

The serializer 93 serially outputs, in each cycle Tv, the modulation pattern signal MDP from MSB (in order of time) based on the multiphase clock signals VCLK0 through VCLK15 and thereby generates modulation data MData.

Figure 19:
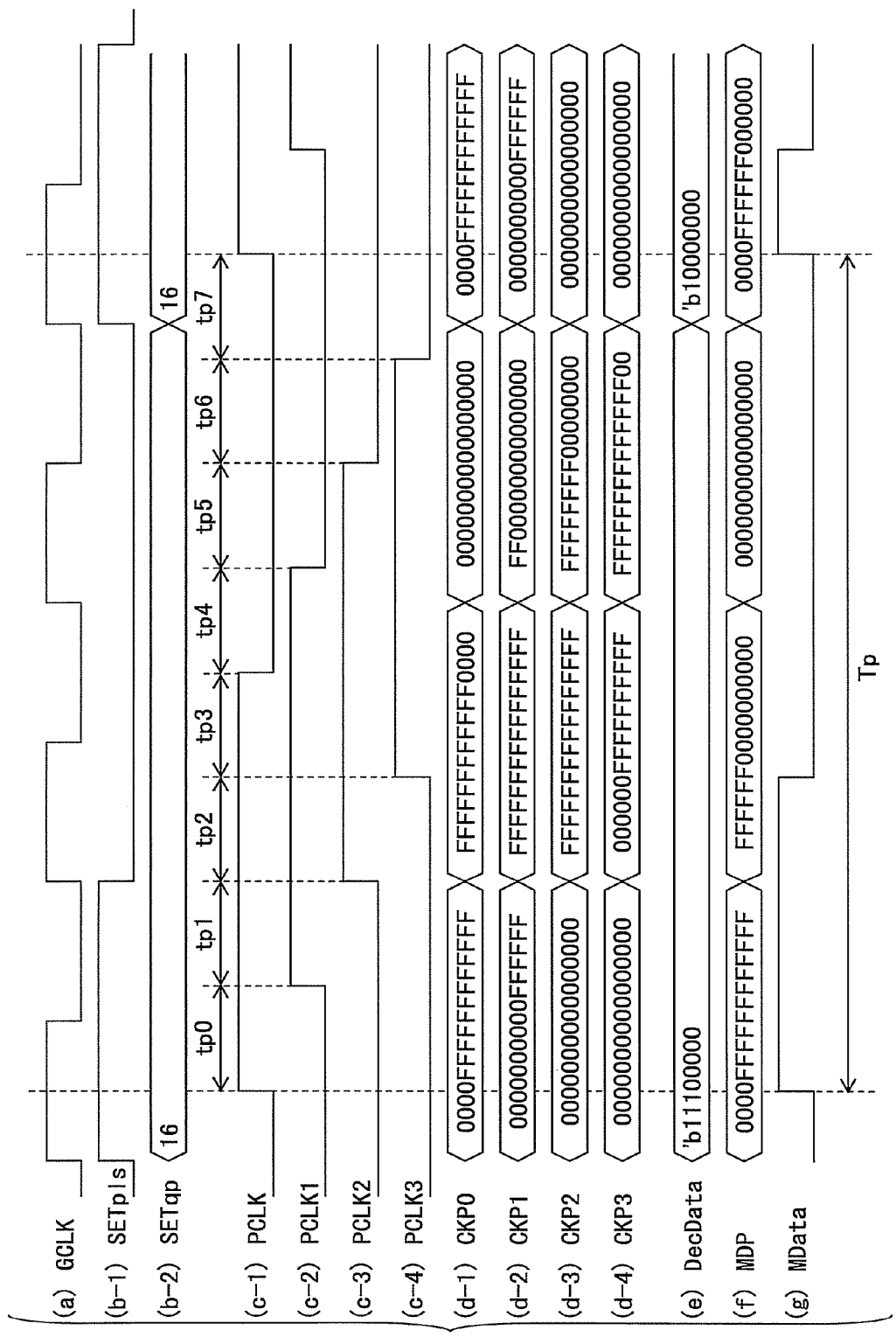
FIG. 19 is a timing chart used to describe operations of a modulation data generating unit.

FIG. 19 is a timing chart used to describe operations of the modulation data generating unit 119. In FIG. 19, (a) indicates GCLK used as a reference clock signal, (b-1) indicates SETpls, (b-2) indicates SETqp, and (c-1) indicates the pixel clock signal PCLK. In this example, it is assumed that the value of the pixel clock frequency specification signal Mnow is 192.

Although not actually generated, (c-2), (c-3), and (c-4) indicate clock signals PCLK1, PCLK2, and PCLK3 that are obtained by delaying the phase of the pixel clock signal PCLK by $\pi/8$, $\pi/4$, and $3\pi/8$, respectively Clock pattern signals CKP0 through CKP3 of (d-1) through (d-4) correspond to PCLK and PCLK1 through PCLK3. Each of the clock pattern signals CKP0 through CKP3 is 64-bit data expressed by hexadecimal notation in order of time from MSB to LSB.

Patterns (PT0 through PT7 in order of time) indicating eight periods (tp0 through tp7) obtained by time-dividing the pixel clock signal PCLK can be generated from the clock pattern signals CKP0 through CKP3.

That is, PT0=CKP0&~CKP1, PT1=CKP1&~CKP2, . . . PT7=~CKP3&~CKP0. In the above equations, & indicates AND operation and ~ indicates NOT operation.

Also in FIG. 19, (e) indicates the pulse-width modulation data DecData, and (f) indicates the modulation pattern signal MDP. The modulated pattern signal MDP is obtained by calculating the formula ({64{DecData[7−i]}}&PTi) repeatedly by changing "i" from 0 to 7 and by performing OR operation of the results. In the above formula, {64{DecData[i]}} represents data obtained by concatenating 64 bits of DecData[i].

The modulation data MData of (g) is generated by serializing the modulation pattern signal MDP of (f). In the example of FIG. 19, the modulation data MData is pulse-width-modulated such that the pulse of the modulation data MData becomes HIGH for the first three-eighths of the PCLK cycle Tp and becomes LOW for the remaining five-eighths of the PCLK cycle Tp.

As described above, in the pixel clock generating unit 118 of the second embodiment, the pixel clock signal PCLK is generated from the multiphase clock signals VCLK0 through VCLK15 and the error Lerr caused by the variation in scanning time is calculated by changing the target value for the respective optical scanning positions. The average frequency Kavg of the pixel clock signal PCLK and the offset value KOfs(i) of the pixel clock frequency are controlled concurrently to reduce the error Lerr, and the frequency of the pixel clock signal PCLK is set based on the frequency setting value K that is the sum of Kavg and KOfs(i). This configuration makes it possible to accurately correct the error in scanning speed and the nonlinear error in scanning speed for each optical scanning position, and also makes it possible to control a high-speed apparatus in a high control frequency band and to effectively reduce high-frequency jitter.

Also, since the pixel clock frequency is accurately controlled in units of the phase difference Tv between the multiphase clock signals VCLK0 through VCLK15, the oscillating frequency of the multiphase clock signals can be comparatively low. This in turn makes it easier to design a circuit and makes it possible to reduce the power consumption. For example, to generate a pixel clock signal with the same resolution, the oscillating frequency of the multiphase clock signals may be one-sixteenth of that of the high-frequency clock signal used in the first embodiment. In other words, when the oscillation frequencies are the same, the second embodiment makes it possible to generate the pixel clock signal at a resolution 16-times higher than that in the first embodiment. Thus, the second embodiment makes it possible to generate a highly-accurate pixel clock signal. Further; since most components of the pixel clock generating unit 118 operate based on the internal operation clock signal GCLK obtained by dividing the frequency of one of the multiphase clock signals VCLK0 through VCLK15, the pixel clock generating unit 118 operates at a lower operating frequency and requires less power than the pixel clock generating unit 111 of the first embodiment.

Third Embodiment

Figure 20:
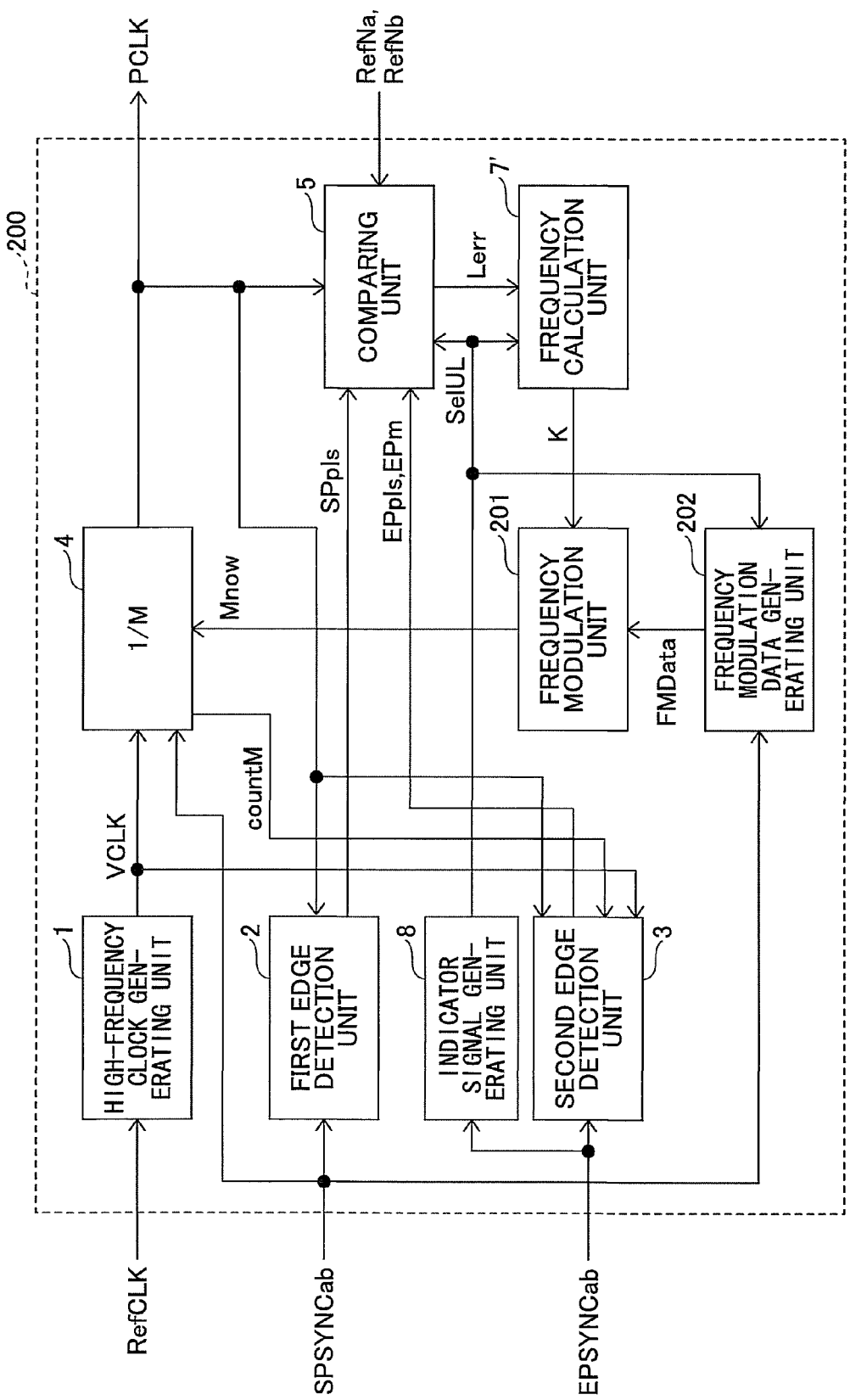
FIG. 20 is a drawing illustrating an exemplary configuration of a pixel clock generating unit according to a third embodiment of the present invention.

FIG. 20 is a drawing illustrating an exemplary configuration of a pixel clock generating unit 200 according to a third embodiment of the present invention. The pixel clock generating unit 200 of the third embodiment is different from the pixel clock generating Unit 111 of the first embodiment in that the frequency calculation unit 7 is replaced with a frequency calculation unit 7', and a frequency modulation unit 201 and a frequency modulation data generating unit 202 are added. The same reference numbers are assigned to components that are common in the first and third embodiments, and descriptions of those components are omitted here.

The frequency calculation unit 7' is different from the frequency calculation unit 7 of FIG. 6 in that the frequency setting value conversion unit 43 is omitted. Therefore, the frequency calculation unit 7' outputs the frequency setting value K. Other configurations of the frequency calculation unit 7' are substantially the same as those of the frequency calculation unit 7.

In each of the period A and the period B determined based on the indicator signal SelUL, the frequency modulation data generating unit 202 generates frequency modulation data FMData corresponding to a scanning position n (indicated by the number of PCLK cycles) expressed relative to the first synchronization signal SPSYNCab.

The frequency modulation data FMData indicate the difference between a pixel clock frequency corresponding to a scanning speed V(n) at the scanning position n and the frequency setting value K indicating the average pixel clock frequency. In this example, the pixel clock frequency corresponding to a scanning speed V(n) at the scanning position n is expressed by a frequency dividing ratio M(n) for dividing the frequency of the high-frequency clock signal VCLK.

Figure 21A:
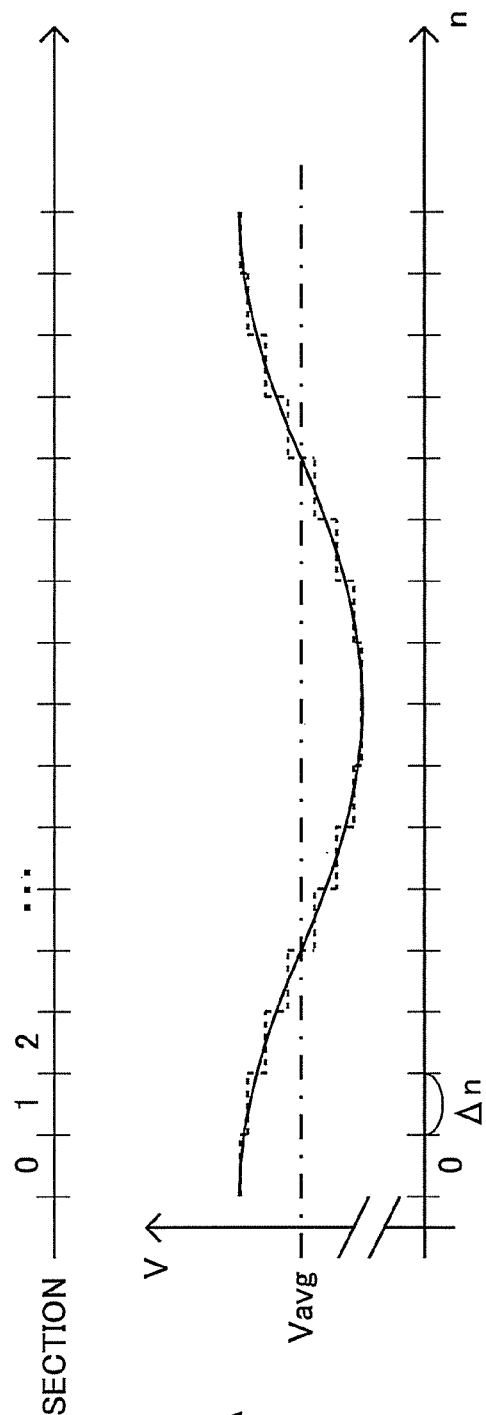
FIG. 21A is a graph showing a relationship between a scanning position and a scanning speed.
Figure 21B:
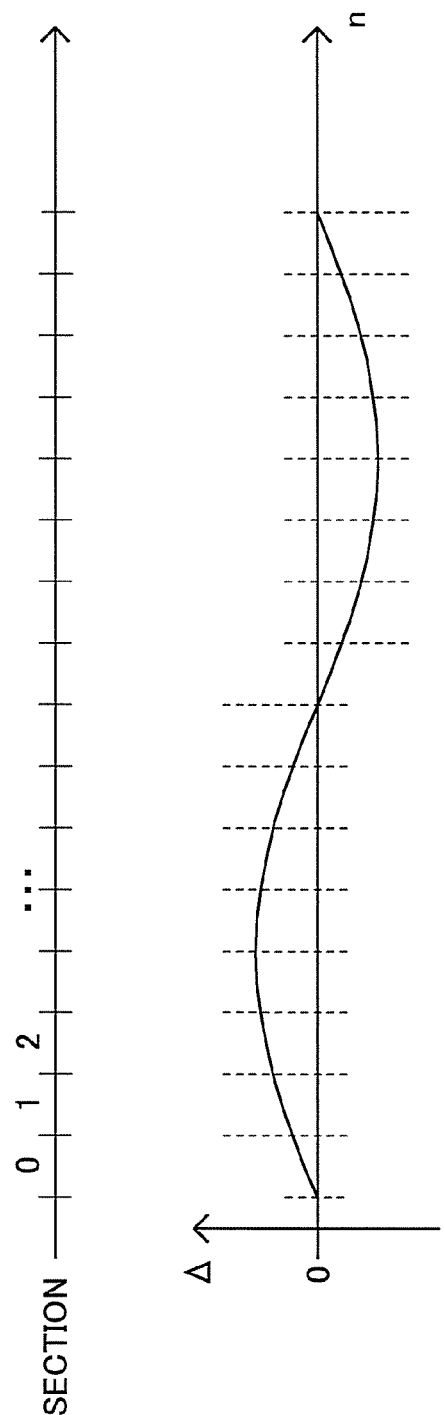
FIG. 21B is a graph showing a deviation of a scanning position from an ideal scanning position.

FIG. 21A is a graph showing a relationship between the scanning position n and the scanning speed V(n), FIG. 21B is a graph showing a deviation $\Delta(n)$ of the scanning position n from an ideal scanning position, and FIG. 21C is a graph showing frequency modulation data FMData(n).

The deviation $\Delta$ of the scanning position n from the ideal position is obtained by integrating the result of V(n)−Vavg. Since nonlinear errors in scanning speed are mainly caused by inaccurate production and assembly of components of a scanning optical system, nonlinear errors at the two optical scanning positions, i.e., in the period A and the period B, are different from each other. Therefore, it is preferable to obtain the frequency modulation data FMData for each of the periods A and B in advance (e.g., at the production stage) and store the obtained frequency modulation data FMData in the frequency modulation data generating unit 202.

An exemplary method of obtaining the frequency modulation data FMData is described below. First, the deviation $\Delta$ from the ideal position is measured at each scan position while performing scanning at a certain pixel clock frequency. Since the differential of the deviation $\Delta$ is the scanning speed V, a pixel clock frequency is obtained from the deviation $\Delta$. Then, the difference between the pixel clock frequency and an average pixel clock frequency signal K is obtained. In short, a scanning speed V' is approximated from the slope between certain scan positions (section $\Delta$n shown in FIG. 21A) and the frequency modulation data FMData (dotted lines in FIG. 21) for the section $\Delta$n are obtained based on the scanning speed V'. This method makes it possible to easily obtain the frequency modulation data FMData. Also, since the obtained frequency modulation data FMData can be used throughout the section $\Delta$n, this method makes it possible to reduce the amount of memory for storing the frequency modulation data FMData. The error in scanning speed can be corrected more accurately by reducing the length of the section $\Delta$n.

The frequency modulation data FMData can be easily obtained by obtaining a difference $\Delta$M of the frequency dividing ratio M. In this case, the pixel clock frequency specification signal Mnow can be obtained by adding the difference $\Delta$M to the average pixel clock frequency signal K.

Also, the frequency modulation data FMData preferably include a fixed-point part in addition to the frequency dividing ratio M to perform the pixel clock frequency modulation more accurately. The fixed-point part may be treated in substantially the same manner as the frequency dividing ratio M. In the descriptions below, it is assumed that the frequency modulation data FMData includes an integer part $\Delta$M and a fixed-point part $\Delta$F.

Figure 22:
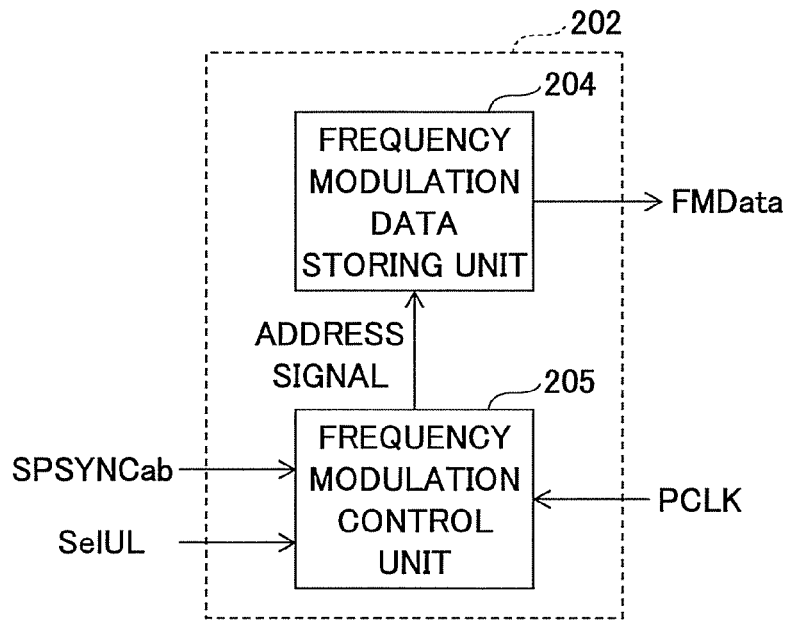
FIG. 22 is a drawing illustrating an exemplary configuration of a frequency modulation data generating unit.

FIG. 22 is a drawing illustrating an exemplary configuration of the frequency modulation data generating unit 202. As illustrated in FIG. 22, the frequency modulation data generating unit 202 includes a frequency modulation data storing unit 204 and a frequency modulation control unit 205. The frequency modulation data storing unit 204 is implemented, for example, by a memory. The frequency modulation data FMData for the respective sections of the scan line in the period A and the period B (or the respective sections of the period A and the period B) are stored beforehand in storage areas of the frequency modulation data storing unit 204. The storage areas have addresses corresponding to section numbers. The frequency modulation data FMData may be stored in another storing unit in the image forming apparatus and may be loaded into the frequency modulation data storing unit 204 when the image forming apparatus is started. The frequency modulation data storing unit 204 outputs the frequency modulation data FMData corresponding to an input address signal.

The frequency modulation control unit 205 determines whether it is in the period A or the period B based on the indicator signals SelUL and generates the address signal based on the section number in the scan line. When receiving the synchronization signal SPSYNCab, the frequency modulation control unit 205 resets the address to 0 and starts counting the cycles of the pixel clock signal PCLK. Each time when the count reaches the length of the section $\Delta$n, the frequency modulation control unit 205 increments the address signal.

Also, the frequency modulation control unit 205 may be configured to increment the address signal every time when the count reaches one of predetermined section lengths. This configuration makes it possible to change the section length according to the amount of frequency change and thereby makes it possible to improve the accuracy in correcting the pixel clock frequency as well as to reduce the amount of memory for storing the frequency modulation data FMData. Further, different section lengths may be used in the period A and the period B. This configuration makes it possible to appropriately correct the nonlinear error in scanning speed in each optical scanning position.

Figure 23:
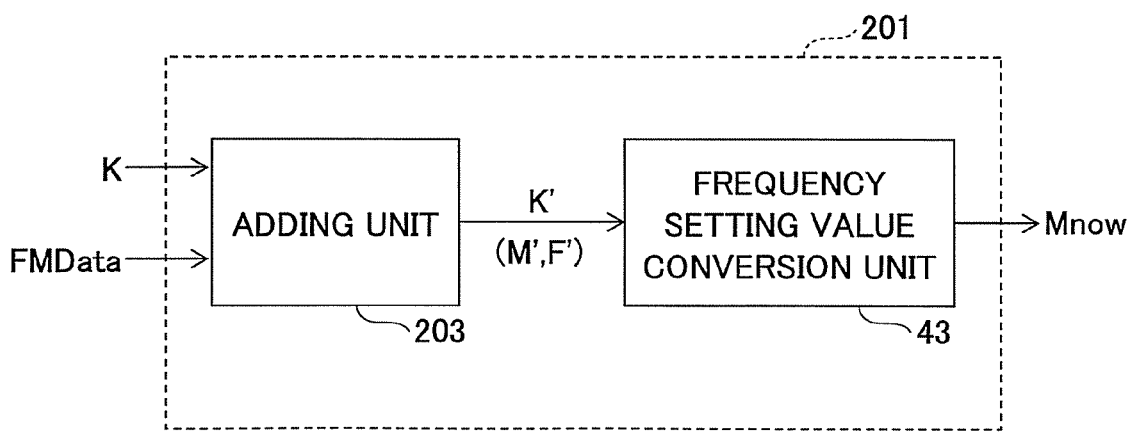
FIG. 23 is a drawing illustrating an exemplary configuration of a frequency modulation unit.

FIG. 23 is a drawing illustrating an exemplary configuration of the frequency modulation unit 201. As illustrated in FIG. 23, the frequency modulation unit 201 includes an adding unit 203 and a frequency setting value conversion unit 43. The adding unit 203 adds the frequency setting value K and the frequency modulation data FMData and outputs an addition result K'. The frequency setting value conversion unit 43 of FIG. 23 has substantially the same configuration as that of the frequency setting value conversion unit 43 of FIG. 6 except that the addition result K' (with an integral part M' and a fixed-point part F') is input from the adding unit 203. Therefore, detailed descriptions of the frequency setting value conversion unit 43 are omitted here.

With the above configuration, the pixel clock generating unit 200 of the third embodiment corrects the frequency of the pixel clock signal PCLK based on the predetermined frequency modulation data FMData in each time section Δ n of the period A or the period B determined based on the indicator signal SelUL. Thus, the pixel clock generating unit 200 can correct even the nonlinear errors and accurately generate the pixel clock signal PCLK.

Fourth Embodiment

Figure 24:
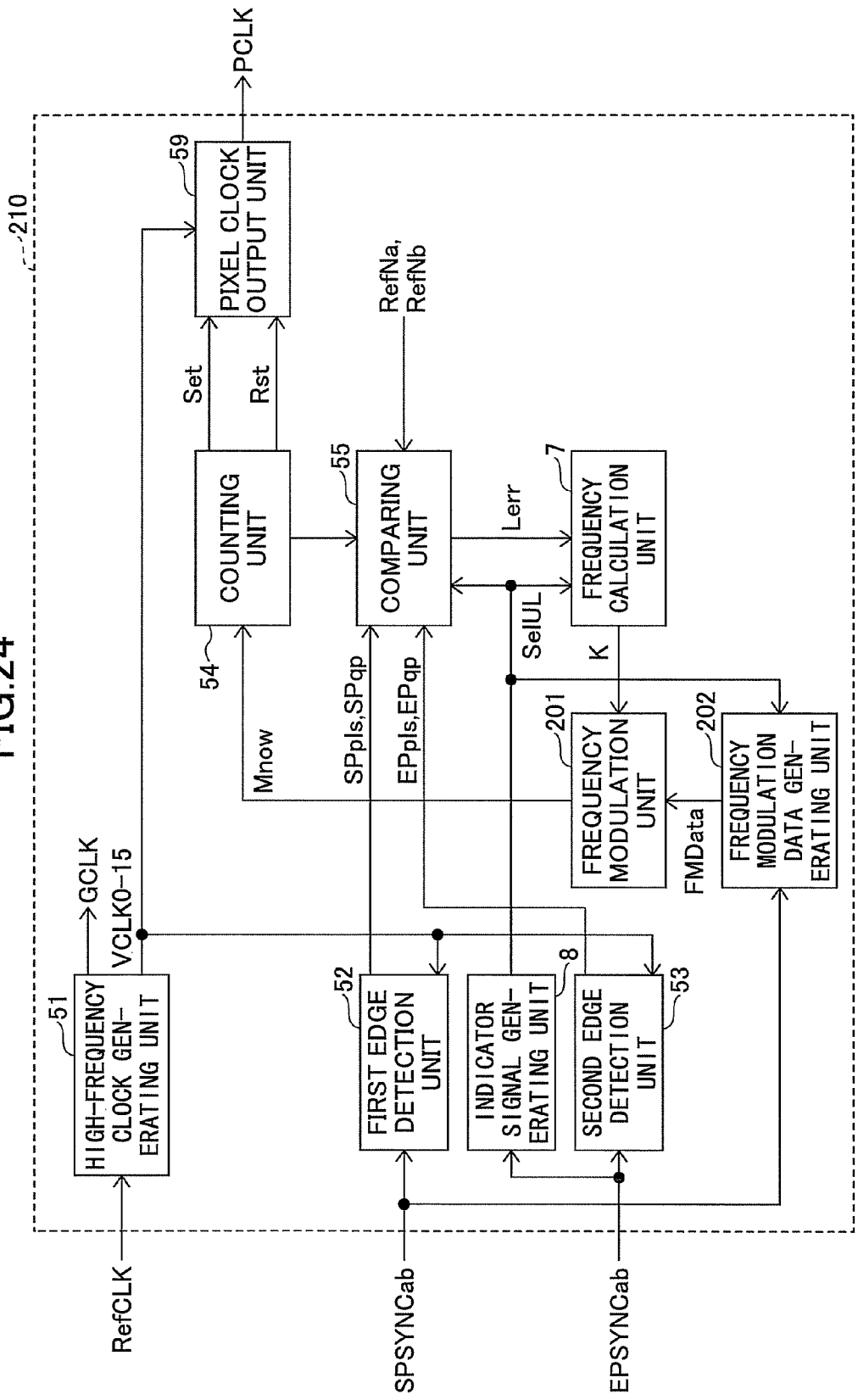
FIG. 24 is a drawing illustrating an exemplary configuration of a pixel clock generating unit according to a fourth embodiment of the present invention.

FIG. 24 is a drawing illustrating an exemplary configuration of a pixel clock generating unit 210 according to a fourth embodiment of the present invention. The same reference numbers are assigned to components that are common in the first and fourth embodiments, and descriptions of those components are omitted here.

The pixel clock generating unit 210 of the fourth embodiment is different from the pixel clock generating unit 118 of the second embodiment in that the frequency calculation unit 7 is replaced with a frequency calculation unit 7', and a frequency modulation unit 201 and a frequency modulation data generating unit 202 are added. The frequency calculation unit 7', the frequency modulation unit 201, and the frequency modulation data generating unit 202 of the fourth embodiment have substantially the same configurations as those of the third embodiment, and therefore descriptions of these components are omitted here.

With the configuration as illustrated in FIG. 24, the pixel clock generating unit 210 of the fourth embodiment corrects the frequency of the pixel clock signal PCLK based on the predetermined frequency modulation data FMData in each time section Δn of the period A or the period B determined based on the indicator signal SelUL. Thus, the pixel clock generating unit 210 can correct even the nonlinear errors and accurately generate the pixel clock signal PCLK.

Also, similarly to the second embodiment, the pixel clock frequency is accurately controlled in units of the phase difference Tv between the multiphase clock signals VCLK0 through VCLK15. Therefore, the oscillating frequency of the multiphase clock signals can be comparatively low. This in turn makes it easier to design a circuit and makes it possible to reduce the power consumption.

<<Outline of Image Forming Apparatus>>

An exemplary configuration of the image forming apparatus 500 including one of the pixel clock generating units 111, 118, 200, and 210 of the first through fourth embodiments is described below.

Figure 25:
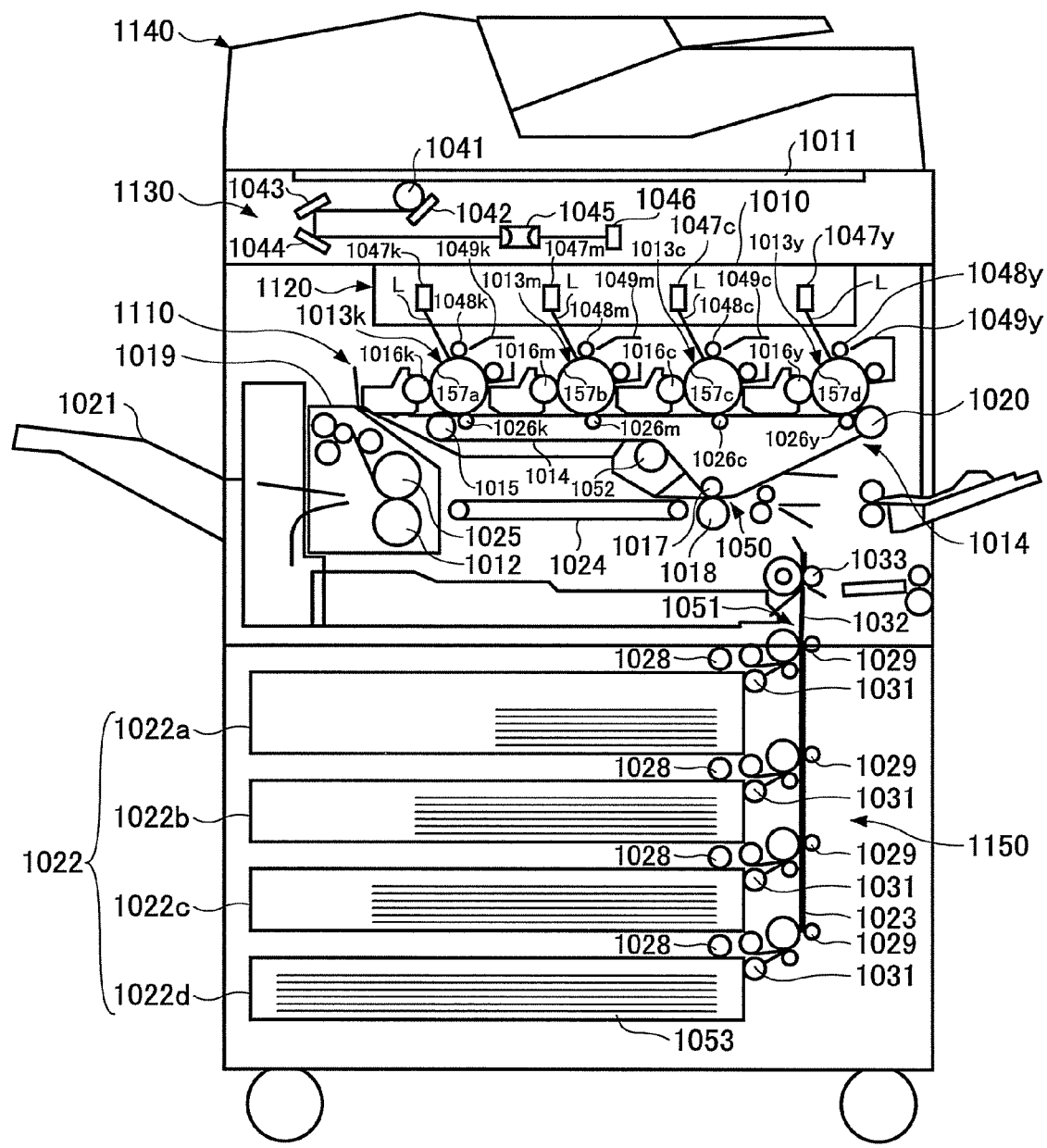
FIG. 25 is a drawing illustrating an exemplary configuration of an image forming apparatus.
Figure 26:
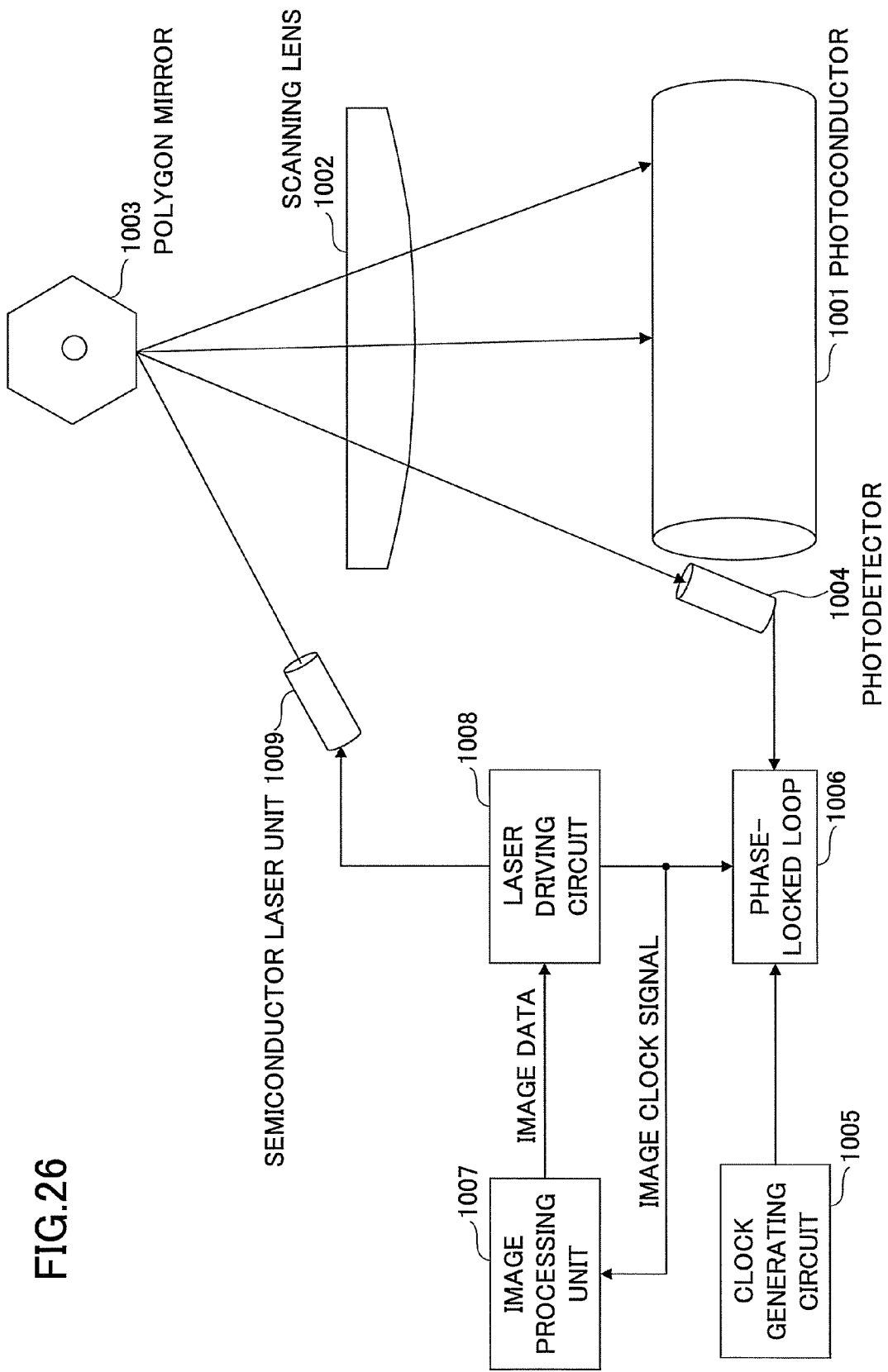
FIG. 26 is a schematic diagram of a related-art image forming apparatus.
Figure 27:
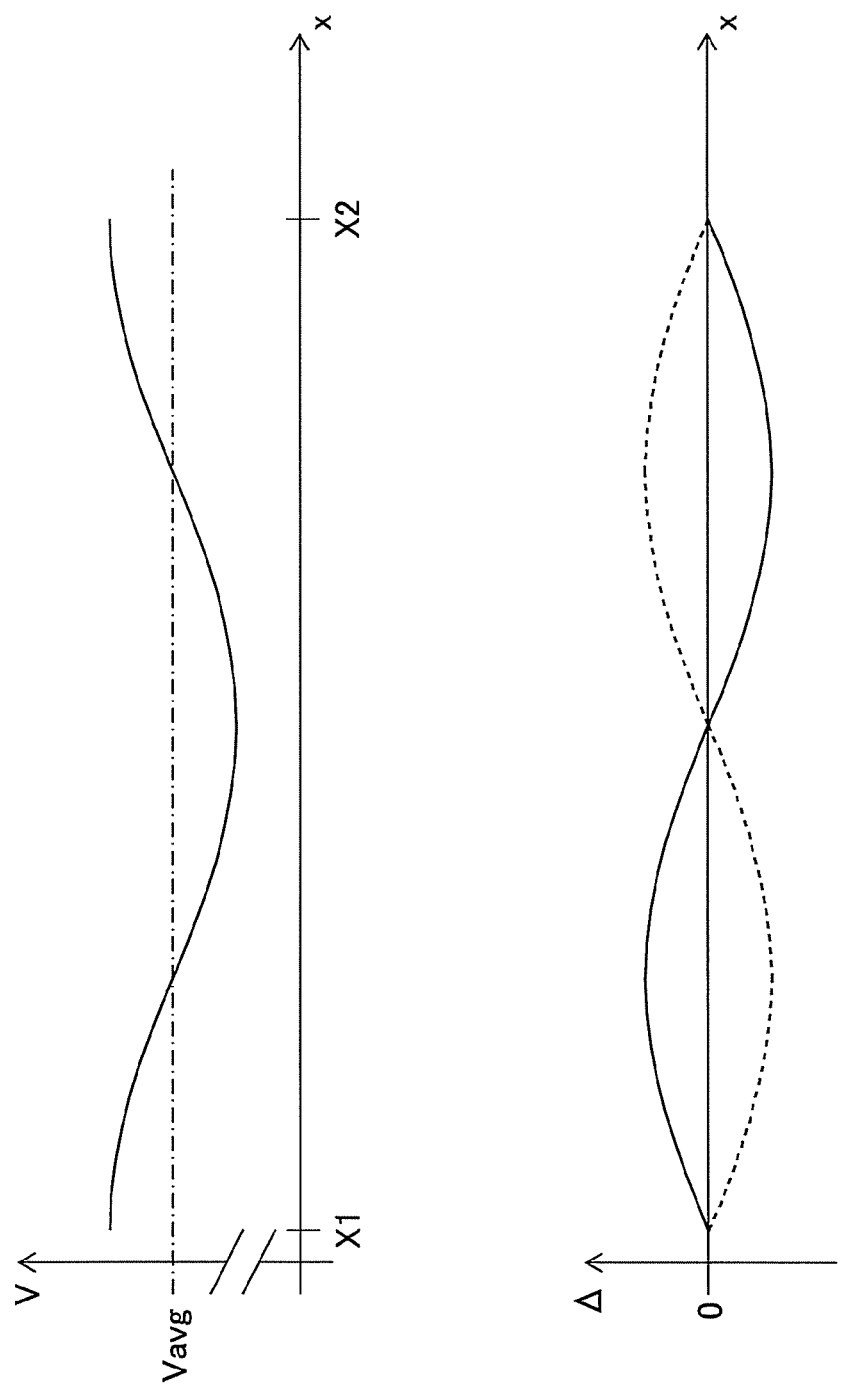
FIGS. 27A and 27B are graphs showing exemplary non-linear errors in scanning speed during the scanning of one line.
Figure 28:
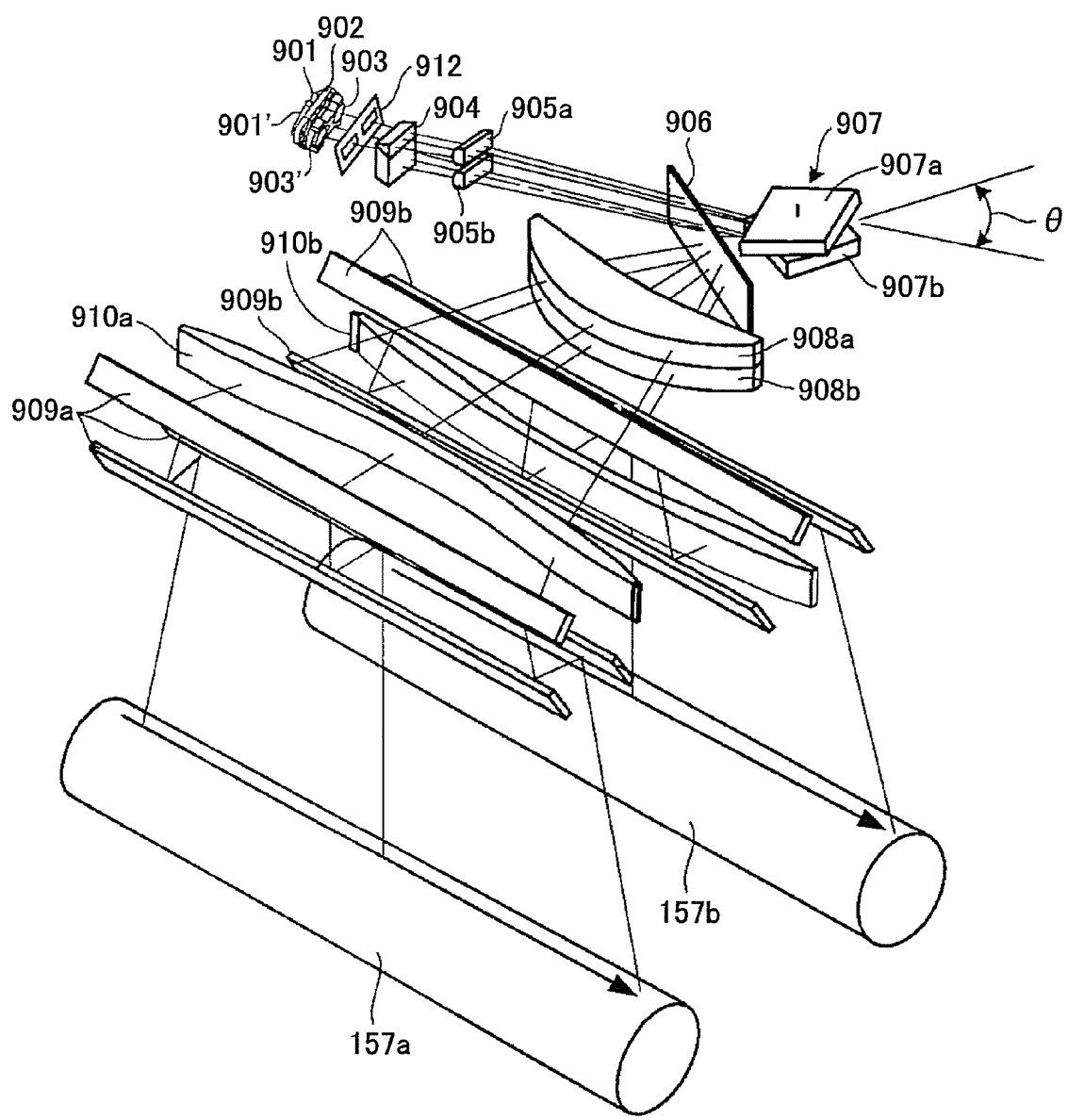
FIG. 28 is a drawing illustrating an optical scanning device of a related-art image forming apparatus.

FIG. 25 is a drawing illustrating an exemplary configuration of the image forming apparatus 500. The image forming apparatus 500 includes an automatic document feeder (ADF) 1140, an image scanning unit 1130, an image writing unit 1120, an image forming unit 1110, and a paper-feeding unit 1150. The ADF 1140 feeds documents placed on a document feeding table one-by-one onto a contact glass 1011 of the image scanning unit 1130 and ejects the documents onto a paper-catch tray after they are scanned.

The image scanning unit 1130 includes the contact glass 1011 and a optical scanning system including an exposure lamp 1041, a first mirror 1042, a second mirror 1043, a third mirror 1044, a lens 1045, and a full-color CCD 1046. The exposure lamp 1041 and the first mirror 1042 are mounted on a first carriage that is moved at a constant speed in the sub-scanning direction by a stepping motor (not shown) when a document is scanned. The second mirror 1043 and the third mirror 1044 are mounted on a second carriage. The second carriage is moved at a speed that is about one half of the speed of the first carriage by a stepping motor (not shown) when a document is scanned. An image surface of the document is optically scanned by moving the first carriage and the second carriage. Light reflected from the image surface of the document is focused by the lens 1045 on a light receiving surface of the CCD 1046 and is photoelectrically converted by the CCD 1046 into image data.

The CCD 1046 outputs image data including red (R), green (G), and blue (B) color components. The image data are converted from analog to digital and the digital image data are processed (e.g., gamma correction, color conversion, image separation, and tone correction) by an image processing circuit.

Based on the processed image data, the image writing unit 1120 forms electrostatic latent images of the respective colors on photoconductor drums 157 of the image forming unit 1110. The image writing unit 1120 corresponds to the scanning optical systems of FIG. 1.

In this example, four photoconductor units 1013 (1013y for yellow, 1013m for magenta, 1013c for cyan, and 1013k for black) are arranged along the rotational direction of an intermediate transfer belt 1014. The photoconductor units 1013k, 1013m, 1013c, and 1013y include photoconductor drums 157a, 157b, 157c, and 157d used as image carriers; charging units 1048k, 1048m, 1048c, and 1048y for charging the photoconductor drums 157a, 157b, 157c, and 157d; exposing lasers 1047k, 1047m, 1047c, and 1047y; developing units 1016k, 1016m, 1016c, and 1016y; and cleaning units 1049k, 1049m, 1049c, and 1049y.

The exposing lasers 1047k, 1047m, 1047c, and 1047y correspond to the four laser beams in FIG. 2 that are deflected by the upper and lower polygon mirrors 907a and 907b. The exposing lasers 1047k, 1047m, 1047c, and 1047y scan the laser beams in the axial direction (main-scanning direction) of the photoconductor drums 157a, 157b, 157c, and 157d and thereby expose the photoconductor drums 157a, 157b, 157c, and 157d. As a result, electrostatic latent images of the corresponding colors are formed on the photoconductor drums 157a, 157b, 157c, and 157d.

Each of the developing units 1016k, 1016m, 1016c, and 1016y includes a developing roller carrying a developer including toner. The developing roller rotates to make visible (or develop) the electrostatic latent image formed on the corresponding one of the photoconductor drums 157a, 157b, 157c, and 157d with the toner and thereby forms a toner image.

The toner images formed on the photoconductor drums 157a, 157b, 157c, and 157d are transferred onto the intermediate transfer belt 1014 at positions (hereafter called primary transfer positions) where the photoconductor drums 157a, 157b, 157c, and 157d are in contact with the intermediate transfer belt 1014. Intermediate transfer rollers 1026k, 1026m, 1026c, and 1026y are disposed to face the photoconductor drums 157a, 157b, 157c, and 157d via the intermediate transfer belt 1014. The intermediate transfer rollers 1026k, 1026m, 1026c, and 1026y are in contact with the inner surface of the intermediate transfer belt 1014 and press the intermediate transfer belt 1014 against the photoconductor drums 157a, 157b, 157c, and 157d. A voltage is applied to the intermediate transfer rollers 1026k, 1026m, 1026c, and 1026y to generate an intermediate transfer electric field that causes the toner images on the photoconductor drums 157a, 157b, 157c, and 157d to be transferred onto the intermediate transfer belt 1014. The transferred toner images of the respective colors are superposed on the intermediate transfer belt 1014 and as a result, a full-color toner image is formed on the intermediate transfer belt 1014.

After images of all colors are formed and transferred, recording paper (recording medium) 1053 (not necessarily a piece of paper) is fed from one of paper-feed trays 1022 in synchronization with the rotation of the intermediate transfer belt 1014. The full-color toner image is transferred (secondary transfer) by a secondary transfer unit 50 from the intermediate transfer belt 1014 to the recording paper 1053.

The paper-feed trays 1022 include a first tray 1022a, a second tray 1022b, a third tray 1022c, and a fourth tray 1022d. The recording paper 1053 may be fed from a duplex unit (not shown) instead of from one of the paper-feed trays 1022. Each of the paper-feed trays 1022 includes a paper-feed roller 1028 that feeds sheets of the recording paper 1053 one by one from the top, and a separating roller 1031 that separates sheets of the recording paper 1053 fed by the paper-feed roller 1028 and feeds the recording paper 1053 into a conveying path 1023.

The paper-feed unit 1150 includes multiple conveying roller pairs 29 disposed along the conveying path 1023. The conveying roller pair 1029 feeds the recording paper 1053 fed from the paper feed tray 1022 into a paper-feed path 1032 in the image forming unit 1110. After a predetermined period of time from when the leading edge of the recording paper 1053 is detected by a resist sensor 1051, the recording paper 1053 is brought into contact with resist rollers 1033 and is temporarily stopped. The resist rollers 1033 feed the recording paper 1053 to a secondary transfer roller 1018 at a specified timing (in synchronization with a sub-scanning effective period signal (FGATE)). The specified timing corresponds to the timing when the full-color toner image is carried by the rotation of the intermediate transfer belt 1014 to the secondary transfer roller 1018.

The secondary transfer roller 1018 is disposed to face a counteracting roller 1017. During a printing process, the secondary transfer roller 1018 is brought into contact with the intermediate transfer belt 1014. The secondary transfer roller 1018 is rotated by a secondary transfer motor such that the rotational speed of the outer surface of the secondary transfer roller 1018 matches the surface speed of the intermediate transfer belt 1014.

After the full-color toner image is transferred, the recording paper 1053 is separated by a separating unit (not shown) from the intermediate transfer belt 1014 and conveyed by a conveyor belt 1024 to a fusing unit 1019 that fuses the full-color toner image onto the recording paper 1053. When no image is to be formed on the other side of the recording paper 1053, the recording paper 1053 is ejected onto a paper-catch tray 1021.

An aspect of this disclosure provides a pixel clock generating device used for an image forming apparatus where two or more optical scanning positions are optically scanned in a time-sharing manner using one light source. The pixel clock generating device is able to accurately correct errors of different levels in scanning speed at the respective optical scanning positions.

According to an embodiment of the present invention, a pixel clock generating device includes a time interval detection unit detecting a time interval between a first signal and a second signal in each of cyclically repeating N ($\geq 2$) time periods; a comparing unit cyclically selecting a target value from N target values corresponding to the N time periods and outputting an error indicating a difference between the detected time interval and the selected target value for each of the N time periods; a frequency calculation unit correcting a frequency of the pixel clock signal based on the error and cyclically generating a frequency specification signal indicating the corrected frequency for each of the N time periods; a high-frequency clock generating unit generating a high-frequency clock signal; and a pixel clock generating unit generating a pixel clock signal based on the frequency specification signal and the high-frequency clock signal.

The pixel clock generating device may also include an indicator signal generating unit generating an indicator signal indicating one of the N time periods based on the first signal or the second signal; and the comparing unit may be configured to select the target value based on the indicator signal.

The pixel clock generating device may also include a frequency modulation data storing unit storing frequency modulation data in association with sections of each of the N time periods, each of the sections corresponding to a predetermined number of cycles of the pixel clock signal and a modulation control unit identifying a time period out of the N time periods based on the indicator signal and causing the frequency modulation data storing unit to output the frequency modulation data associated with one of the sections of the identified time period each time a count of cycles of the pixel clock signal reaches the predetermined number. The pixel clock generating unit may be configured to generate the pixel clock signal according to the sum of the frequency specification signal and the output frequency modulation data.

The pixel clock generating device may also include a counting unit. The high-frequency generating unit may be configured to generate multiphase clock signals having a phase difference Tv from each other; the counting unit may be configured to measure time corresponding to the frequency specification signal in units of the phase difference Tv; and the pixel clock generating unit may be configured to generate the pixel clock signal with a cycle corresponding to the measured time based on the high-frequency clock signal.

Alternatively, the counting unit may be configured to measure the time corresponding to a sum of the frequency specification signal and the output frequency modulation data.

The frequency calculation unit may include an average frequency calculation unit configured to total the errors in each of the N time periods according to the indicator signal to obtain a total error value, select one of the N target values corresponding to the N time periods according to the indicator signal, and generate the frequency specification signal for each of the N time periods based on the selected one of the N target values, the error, and the total error value.

The frequency calculation unit may also include a reference error storing unit storing reference error values corresponding to the N time periods and outputting one of the reference error values based on a cycle identification signal indicating one of M calculation cycles; a difference data storing unit calculating a difference between the one of the reference error values and the error and storing difference data indicating total of the differences for each of the M calculation cycles; and an offset calculation unit calculating an offset of the frequency specification signal based on the difference data for each of the M calculation cycles according to the cycle identification signal.

According to an embodiment of the present invention, an image forming apparatus may include the pixel clock generating device as described above, and an image forming unit modulating image data based on the pixel clock signal generated by the pixel clock generating device and forming an image by emitting a laser beam based on the modulated image data.

The image forming unit may be configured to form an image by emitting a laser beam in each of the N time periods based on the modulated image data.

The present invention is not limited to the specifically disclosed embodiments, and variations and modifications may be made without departing from the scope of the present invention.

What is claimed is:

1. A device for generating a pixel clock signal, comprising:
    a time interval detection unit detecting a time interval between a first set of first and second signals and a time interval between a second set of first and second signals, each set in cyclically repeating N time periods in one scanning cycle, N being an integer having a value greater than or equal to two;
    a comparing unit cyclically selecting a different target value from N target values corresponding to the N time periods and outputting an error indicating a difference between the detected time interval and the selected different target value for each of the N time periods;
    a frequency calculation unit correcting a frequency of the pixel clock signal based on the error and cyclically generating a frequency specification signal indicating the corrected frequency for each of the N time periods;
    a high-frequency clock generating unit generating a high-frequency clock signal;
    a pixel clock generating unit generating the pixel clock signal based on the frequency specification signal and the high-frequency clock signal; and
    an indicator signal generating unit generating an indicator signal indicating one of the N time periods based on the first set of first and second signals or the second set of first and second signals,
    wherein the comparing unit selects the different target value based on the indicator signal and
    wherein the frequency calculation unit includes an average frequency calculation unit configured to
        total the errors in each of the N time periods according to the indicator signal to obtain a total error value,
        select one of the N target values corresponding to the N time periods according to the indicator signal, and
        generate the frequency specification signal for each of the N time periods based on the selected one of the N target values, the error, and the total error value.

2. The device as claimed in claim 1 wherein the frequency calculation unit further includes
    a reference error storing unit storing reference error values corresponding to the N time periods and outputting one of the reference error values based on a cycle identification signal indicating one of M calculation cycles;
    a difference data storing unit calculating a difference between the one of the reference error values and the error and storing difference data indicating a total of the differences for each of the M calculation cycles; and
    an offset calculation unit calculating an offset of the frequency specification signal based on the difference data for each of the M calculation cycles according to the cycle identification signal.

3. An image forming apparatus, comprising:
    the device of claim 1; and
    an image forming unit modulating image data based on the pixel clock signal generated by the device and forming an image by emitting a laser beam based on the modulated image data.

4. An image forming apparatus, comprising:
    the device of claim 1; and
    an image forming unit modulating image data based on the pixel clock signal generated by the device and forming an image by emitting a laser beam in each of the N time periods based on the modulated image data.

* * * * *